(12) United States Patent
Kimura et al.

(10) Patent No.: US 10,052,945 B2
(45) Date of Patent: Aug. 21, 2018

(54) FUEL SUPPLY SYSTEM

(71) Applicant: NIKKI CO., LTD., Atsugi (JP)

(72) Inventors: Kazuki Kimura, Kanagawa (JP);
Teruyuki Wakabayashi, Kanagawa (JP); Yukinori Suematsu, Kanagawa (JP)

(73) Assignee: Nikki Co., Ltd. (JP)

( * ) Notice: Subject to any disclaimer, the term of this patent is extended or adjusted under 35 U.S.C. 154(b) by 184 days.

(21) Appl. No.: 14/868,035

(22) Filed: Sep. 28, 2015

(65) Prior Publication Data

US 2016/0016463 A1 Jan. 21, 2016

Related U.S. Application Data

(63) Continuation-in-part of application No. 14/293,595, filed on Jun. 2, 2014, now abandoned.

(30) Foreign Application Priority Data

Apr. 17, 2015 (JP) .................................. 2015-084790
Apr. 17, 2015 (JP) .................................. 2015-084791
Apr. 17, 2015 (JP) .................................. 2015-084792

(51) Int. Cl.
*B60K 15/03* (2006.01)
*B60K 15/01* (2006.01)

(52) U.S. Cl.
CPC .............. *B60K 15/03* (2013.01); *B60K 15/01* (2013.01); *B60K 2015/03236* (2013.01); *B60K 2015/03243* (2013.01); *Y10T 137/85978* (2015.04)

(58) Field of Classification Search
CPC .......... B60K 15/01; B60K 2015/03032; B60K 2015/03453; B60K 2015/03467; B60K 2015/03243; F02M 37/14; F02M 37/103; F02M 37/106
See application file for complete search history.

(56) References Cited

U.S. PATENT DOCUMENTS 4,135,984 A * 1/1979 Kirschmann ............ B01D 3/02
                                                                     202/196
5,389,245 A * 2/1995 Jaeger .................... F02M 37/20
                                                                     123/497

(Continued)

FOREIGN PATENT DOCUMENTS

WO    WO 2011085156 A1 *  7/2011 ............. F02M 37/08

*Primary Examiner* — William McCalister
*Assistant Examiner* — Patrick Williams
(74) *Attorney, Agent, or Firm* — Fishman Stewart PLLC

(57) ABSTRACT

To provide a fuel supply system in which fuel stored in a fuel storage tank formed in a housing main body can be supplied by a high-pressure pump provided in the housing main body in spite of a rapid acceleration or a rapid deceleration of an engine, two types of connectors, which is a first connector having a low-pressure pump having a connection port for a fuel supply pipe from a fuel tank and a second connector having no pump, can be selectively attached via a common connector mounting part formed on a wall surface of a housing main body, and by using a housing having therein the commonly used high-pressure pump, a fuel supply system using an external pump and a fuel supply system using no external pump can be respectively manufactured in accordance with the purpose of use.

3 Claims, 28 Drawing Sheets

(56) References Cited

U.S. PATENT DOCUMENTS

| | | | | |
|---|---|---|---|---|
| 6,158,461 A | * | 12/2000 | Frank .................. | B60K 15/077 123/509 |
| 6,176,260 B1 | * | 1/2001 | Hahner ............... | B60K 15/077 123/468 |
| 2013/0119077 A1 | * | 5/2013 | Elsasser ............. | B29C 49/0047 220/694 |

* cited by examiner

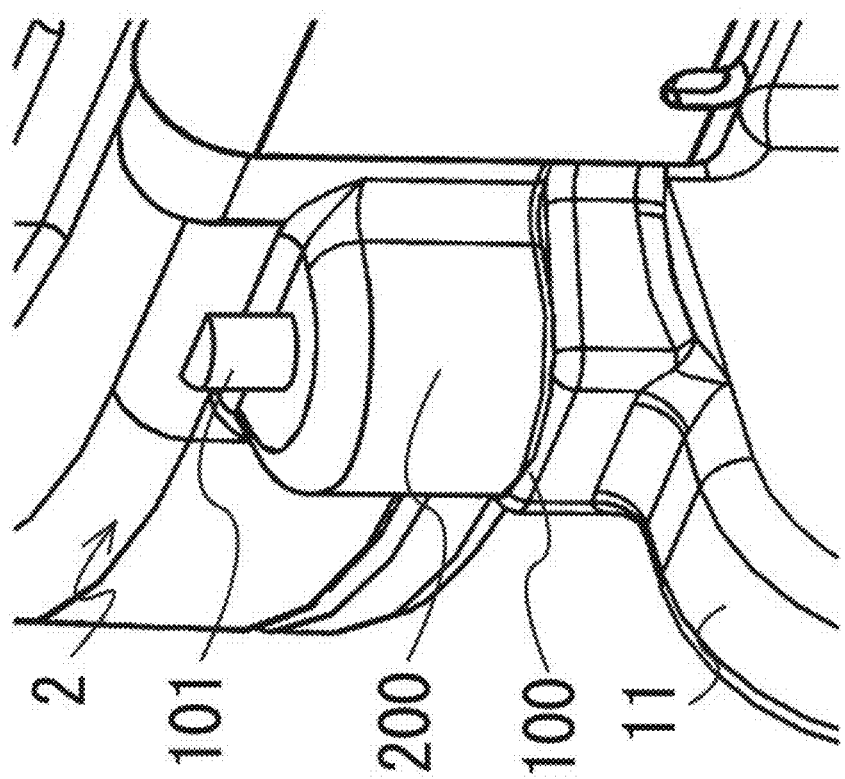

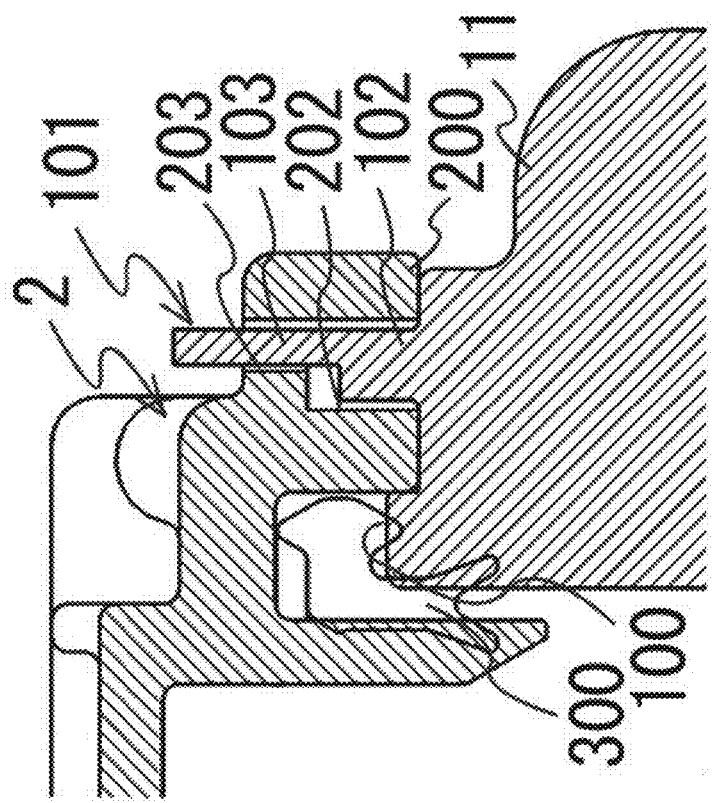

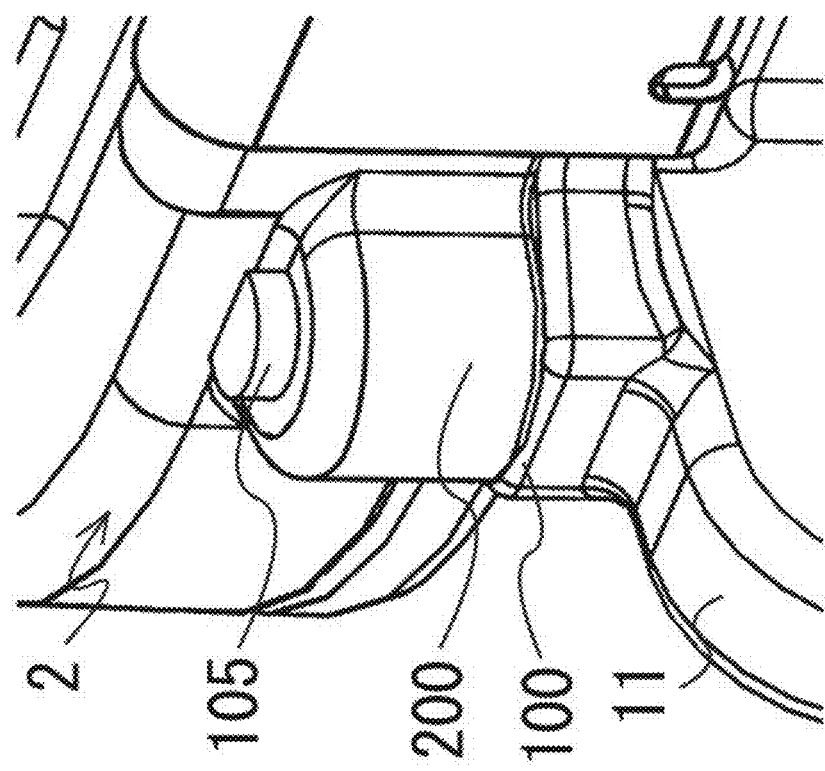

FUEL SUPPLY SYSTEM

CROSS-REFERENCE TO RELATED APPLICATION

This application claims priority to and is a Continuation-in-Part of U.S. patent application Ser. No. 14/293,595 filed Jun. 2, 2014. It also claims priority to JP Patent Application Nos. 2015084790, 2015084791, and 2015084792 filed on Apr. 17, 2015. This application incorporates by reference in its entirety each of the above-identified applications.

BACKGROUND

The present invention relates to an improvement of a fuel supply system provided in the middle of a fuel supply pipe, as described in U.S. Pat. No. 6,390,871 and JP 2013-516576 W (PCT/US2011/020454), to supply liquid fuel stored in a fuel tank to an engine.

When supplying the liquid fuel stored in the fuel tank to the engine, it is necessary to continuously supply fuel even if there is a rapid acceleration or a rapid deceleration, and it is also necessary to prevent evaporation of the fuel due to high temperatures generated by operation of the engine.

In order to address this issue, conventionally, U.S. Pat. No. 6,390,871 proposes an engine control module equipped with two pumps in a reserve tank, for example. This engine control module is provided in the reserve tank with a first fuel pump as a draw-up pump for drawing up the fuel from a fuel tank to a reserve tank and a second fuel pump for feeding the fuel drawn-up into the reserve tank into a fuel rail of the engine at a higher pressure; thus, the engine control module has advantages of saving pipes for a fuel pipe, easy manufacturing, and further prevention of fuel leakage. However, this prior art has two fuel pumps disposed in the reserve tank, and thus has issues that assembly and mounting are cumbersome and the production cost is high.

In order to solve these problems, JP 2013-516576 W (PCT/US2011/020454) proposes a vapor separator (fuel pump). As shown in FIG. 7, a vapor separator (see FIG. 6) is proposed in which there is disposed in the reserve tank RT a high-pressure pump P2 for feeding the fuel drawn-up in the reserve tank RT into the fuel rail of an engine at a higher pressure and there is disposed a low-pressure fuel pump P1 which is constituted by a pulse pump for drawing up the fuel from the fuel tank to the reserve tank RT and is integrally formed on the outside of the reserve tank RT, for example; thus, the vapor separator can be assembled more easily and be provided at a lower price.

However, this fuel supply system (vapor separator) is a system, in which the pulse pump as the low-pressure pump P1 is formed on a housing H having the reserve tank RT integrally and indivisibly, and which has to have two pumps; thus, there is a big problem that the fuel supply system cannot be applied to a system which supplies a sufficient amount of fuel to the engine by using, for example, the reserve tank RT and the second high-pressure pump P2 even when the rapid acceleration or the rapid deceleration occurs.

SUMMARY

The present invention relates to improvement to a conventional fuel supply system having a reservoir provided in the middle of the fuel supply pipe to supply the stored liquid fuel in the fuel tank to the engine, and an object of the invention is to provide a fuel supply system which is useful for many purposes and is excellent in cost.

The present invention includes: a housing configured to have a lid body airtightly covering an opening formed in an upper surface of a housing main body which forms a fuel storage tank which doubles as a reservoir, and configured to have, in a sidewall of the housing main body, a fuel intake port communicating with the fuel storage tank; a high-pressure pump provided in the housing main body to supply fuel stored in the fuel storage tank to an engine; and a connector which is integrally attachable to the sidewall of the housing main body, the connector including: a fuel-feeding port configured to be in touch with and communicate with the fuel intake port formed in the wall surface when the fuel-feeding port is attached to the sidewall; and a connection port configured to communicates with the fuel-feeding port and to accept a fuel supply pipe from a fuel tank, wherein the connector includes a two types of connectors including a first connector having a low-pressure pump and a second connector having no pump, and wherein the two types of connectors is selectively attachable via a common connector mounting part formed on the sidewall of the housing main body. Thus, by using a common housing in which a high-pressure pump is installed, a fuel supply system using an external pump and a fuel supply system using no pump can be manufactured.

Further, a configuration is made such that in the fuel storage tank formed in the housing main body, there is provided a float having a regulator function for keeping a liquid surface of the fuel stored in the fuel storage tank at a predetermined position; thus, the regulator function can be installed in a small space.

Further in the present invention, the fuel intake port formed in the wall surface of the housing main body is formed above a liquid surface of the stored fuel; thus, even in the case that the external pump is not used, the fuel can be taken in, by free fall, from the fuel tank into the fuel storage tank formed in the housing main body.

The high-pressure pump can be easily and securely installed in the housing main body by a lower part of the high-pressure pump being held by pressure against a holding member which is provided on a bottom part of a fuel storage part of the housing main body, is formed of a resilient material, and has a flow passage communicating with the fuel storage part, in such a manner that a suction port is opened to the flow passage. In addition, a blitz type filter is provided on the holding member provided on a bottom part of a fuel storage part of the housing main body in such a manner that a feed-out port is opened to a flow passage, and a lower part of the high-pressure pump is held by pressure in such a manner that a suction port is opened to the flow passage; thus, a plurality of components can be fixed with the single holding member.

Still further, the high-pressure pump includes a connection electrode on an upper part thereof, and the connection electrode is provided to penetrate through the lid body; thus, it can be easy to install the pump and secure airtightness of the housing, whereby the number of components is reduced, and electric connection and electrical maintenance are simple. In addition, because the housing main body and the lid body are fixed to each other with a spring clip, assembly and disassembly are easy and the airtightness of the housing can be maintained.

In addition, a threaded hole, which is of threaded holes formed in the wall surface of the housing main body to receive fixing bolts for fixing a first connector having a low-pressure pump and is formed on a bottom part, and a drain reservoir formed to be recessed in a bottom surface of the housing main body are communicated with each other through a drain passage having a smaller diameter than the threaded hole; and drain (water or impurities contained in the fuel) stored in the drain reservoir can be discharged through the threaded hole and the drain passage, whereby the drain stored in the bottom part in the housing main body is easily made to discharge from outside of the housing.

In addition, a positioning pin is integrally provided protrudingly at a predetermined position on an opening edge of the housing main body, and a positioning hole which fits the positioning pin is formed in a flange of the lid body to be in contact with and opposed to the opening edge of the housing; thus, it goes without saying that sealing can be easily and surely done, and because the positioning pin protrudingly provided on the housing main body is fixed at a predetermined fitting position, the action of fixing the lid body on the housing main body can also be provided.

Further, in the case that a holding member holding a regulator used in the present invention is in an arched shape as a whole and has leg parts protrudingly provided on lower surfaces of both ends of the holding member, the both ends being configured to be placed on support plates each of which is protrudingly provided on each of mutually opposing inner wall surfaces of the fuel storage tank, on a part of a surface of a holding member main body which has a length long enough for at least one end part to be close to the inner wall surface of the fuel storage tank, there is formed on an upper end surface a receiving surface on which a holding flange protrudingly provided on a circumferential wall of a pressure regulating unit main body of a regulator, and a regulator receiving part made up of a recessed part for holding the regulator with a space between the regulator receiving part and a return port of the regulator; and an extra fuel discharge passage in a gutter shape communicating with the space of the regulator receiving part is formed in the surface of the holding member main body from the regulator receiving part to the end part close to the inner wall surface of the fuel storage tank, since extra fuel from the regulator is returned to the fuel stored in the fuel storage tank along the inner wall surface of the fuel storage tank from a tip of the extra fuel discharge passage, it is possible to eliminate the fluctuation of the amount of the stored fluid caused by the disturbance of the liquid surface due to the extra fuel from the regulator flowing down into the fuel stored in the fuel storage tank, whereby the fuel can be stably supplied to the engine by the high-pressure pump.

BRIEF DESCRIPTION OF THE DRAWINGS

FIG. 17(a) is a partial perspective view showing a main part before a positioning pin in the embodiment shown in FIG. 15 is caulked;

FIG. 17(b) is a partial sectional view showing the main part before the positioning pin in the embodiment shown in FIG. 15 is caulked;

FIG. 18(a) is a diagram showing a partial perspective view of the main part after the positioning pin in the embodiment shown in FIG. 15 is caulked;

DETAILED DESCRIPTION

Figure 1:
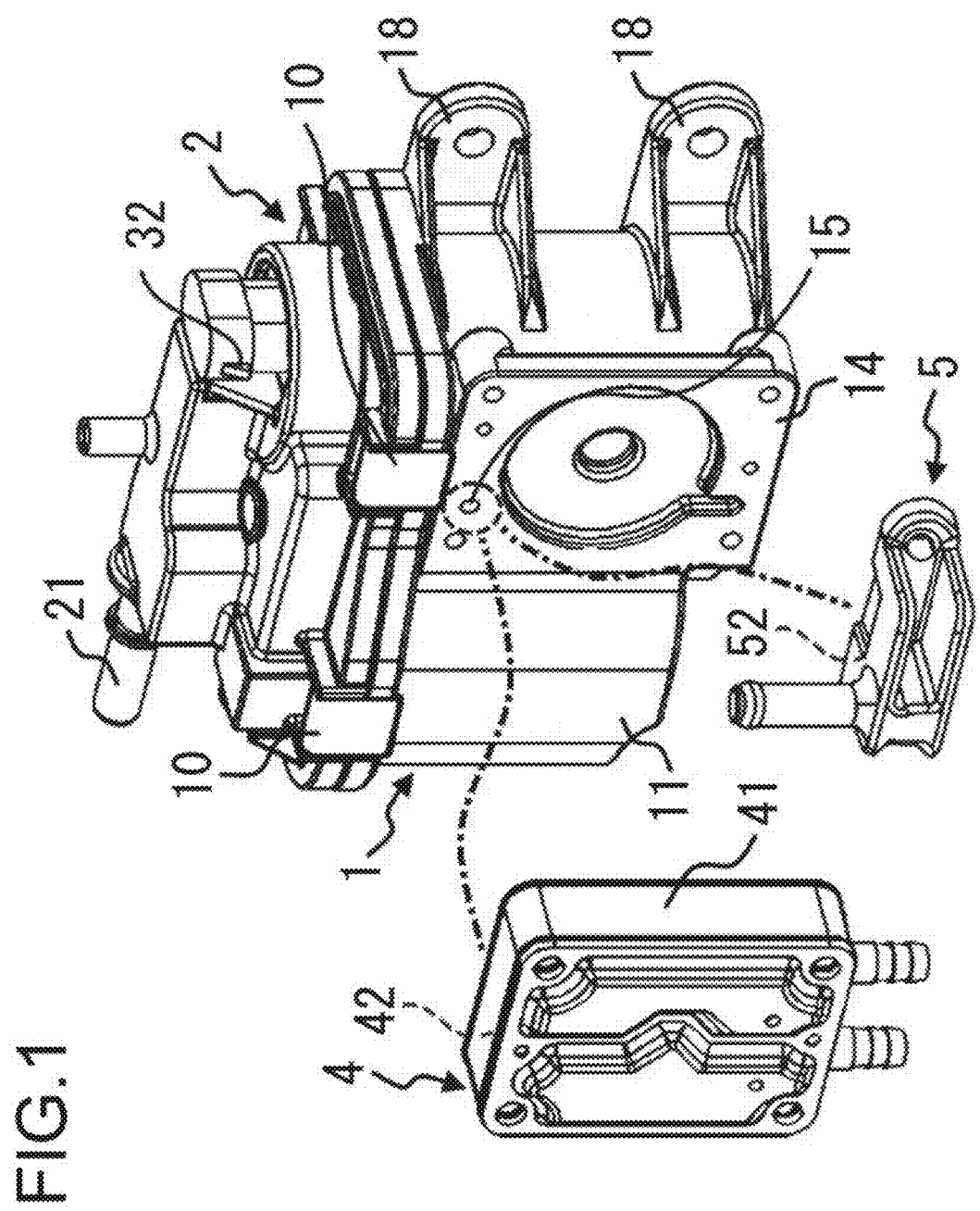
FIG. 1 is a perspective view showing a fuel supply system of a first embodiment of a preferred embodiment of the present invention in a state that two types of connectors which are a first connector and a second connector are disassembled.
Figure 2:
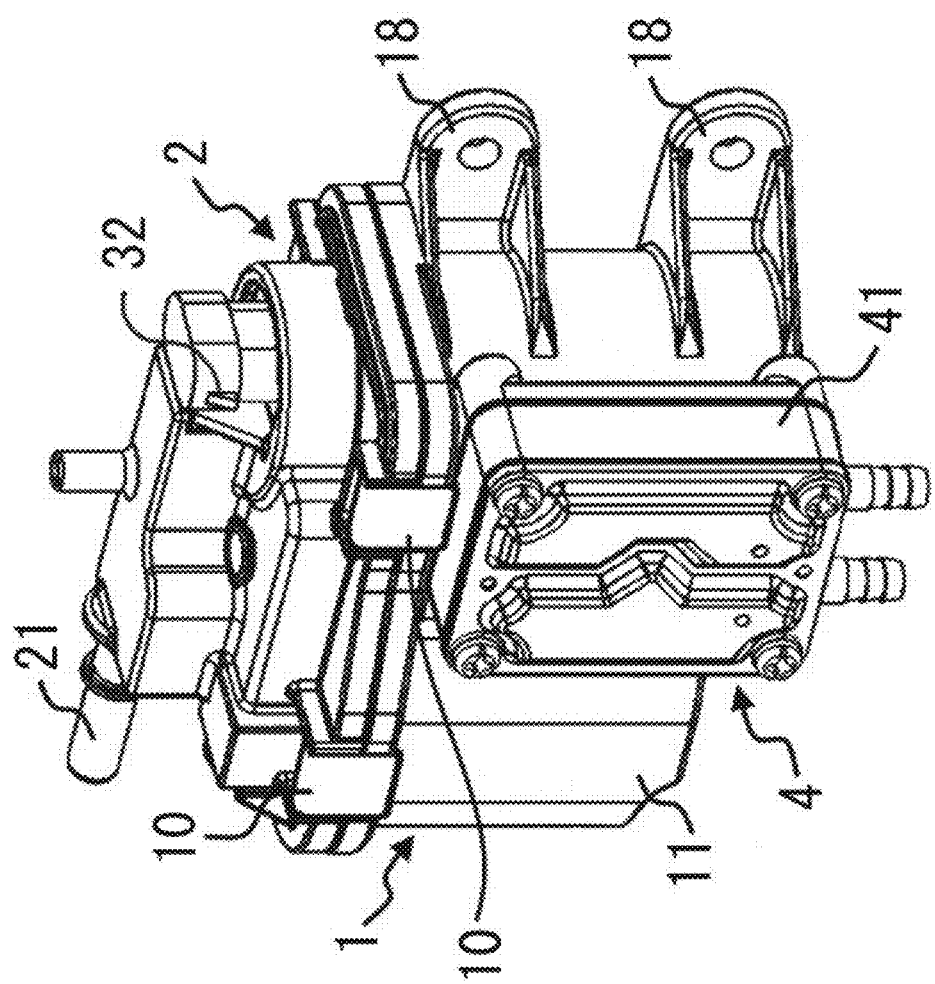
FIG. 2 is a perspective view showing a state that the first connector of the embodiment shown in FIG. 1 is attached.
Figure 3:
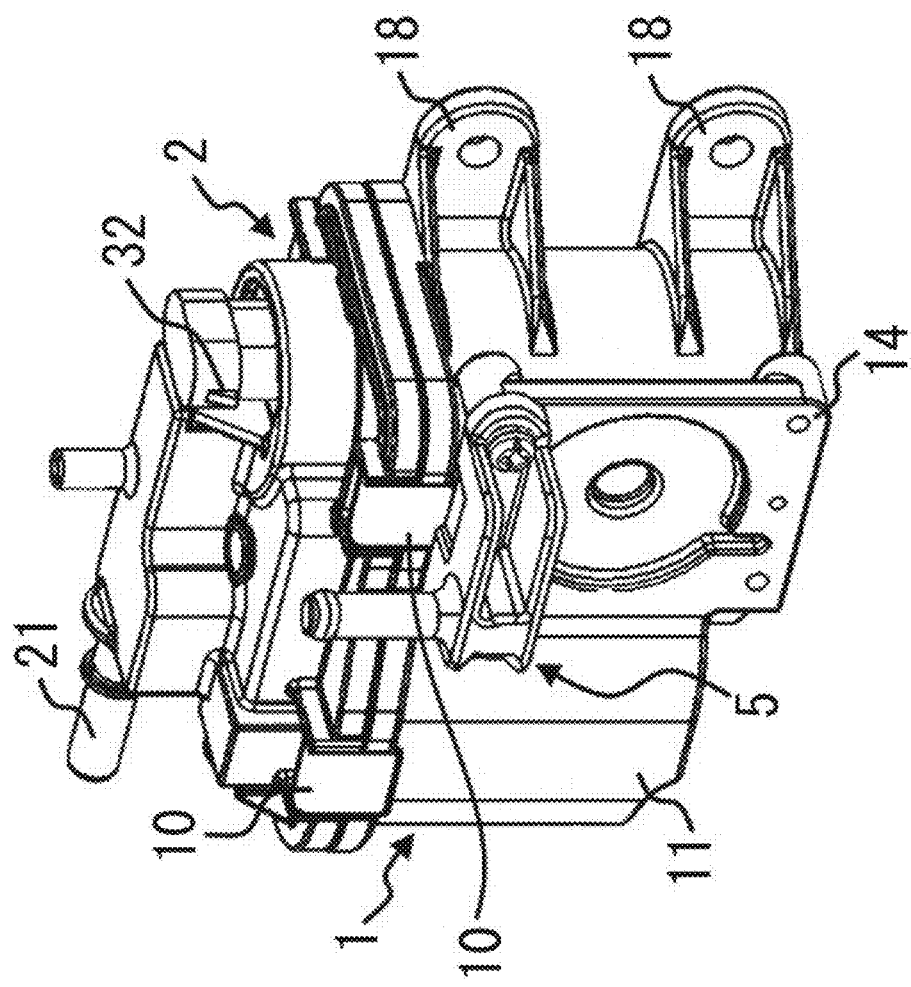
FIG. 3 is a perspective view showing a state that the second connector of the embodiment shown in FIG. 1 is attached.
Figure 4:
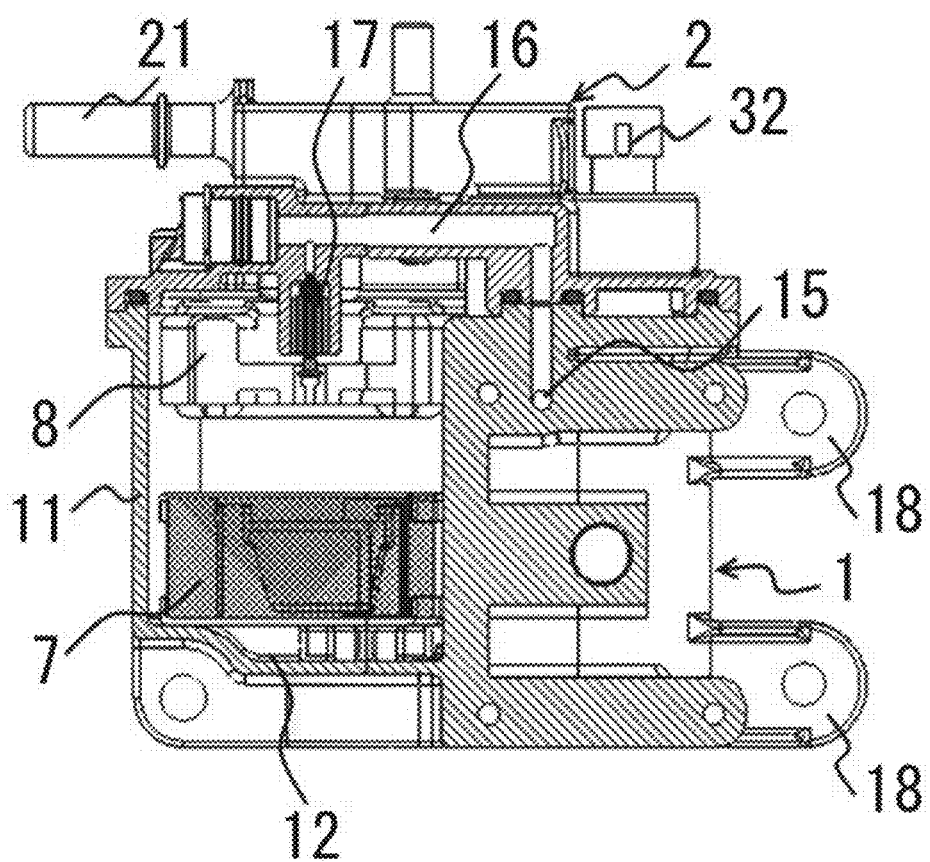
FIG. 4 is a vertical cross sectional view of the embodiment shown in FIG. 1.
Figure 5:
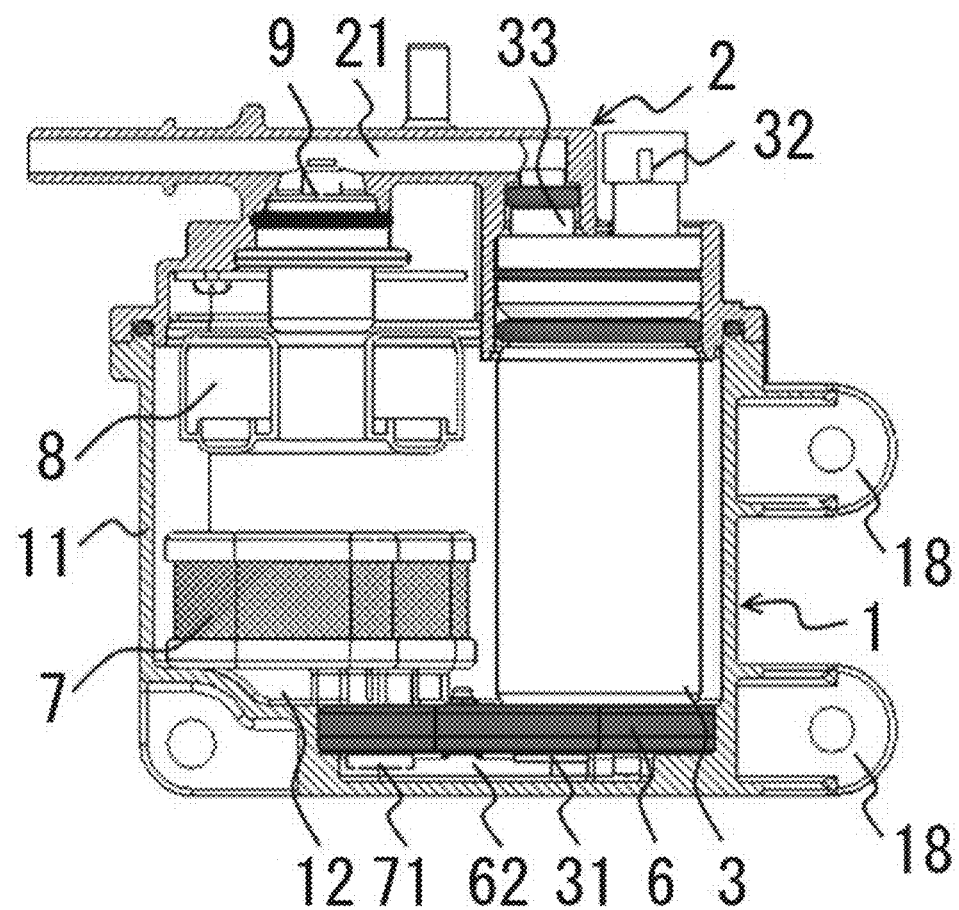
FIG. 5 is a vertical cross sectional view of the embodiment shown in FIG. 1 at a different position.
Figure 6:
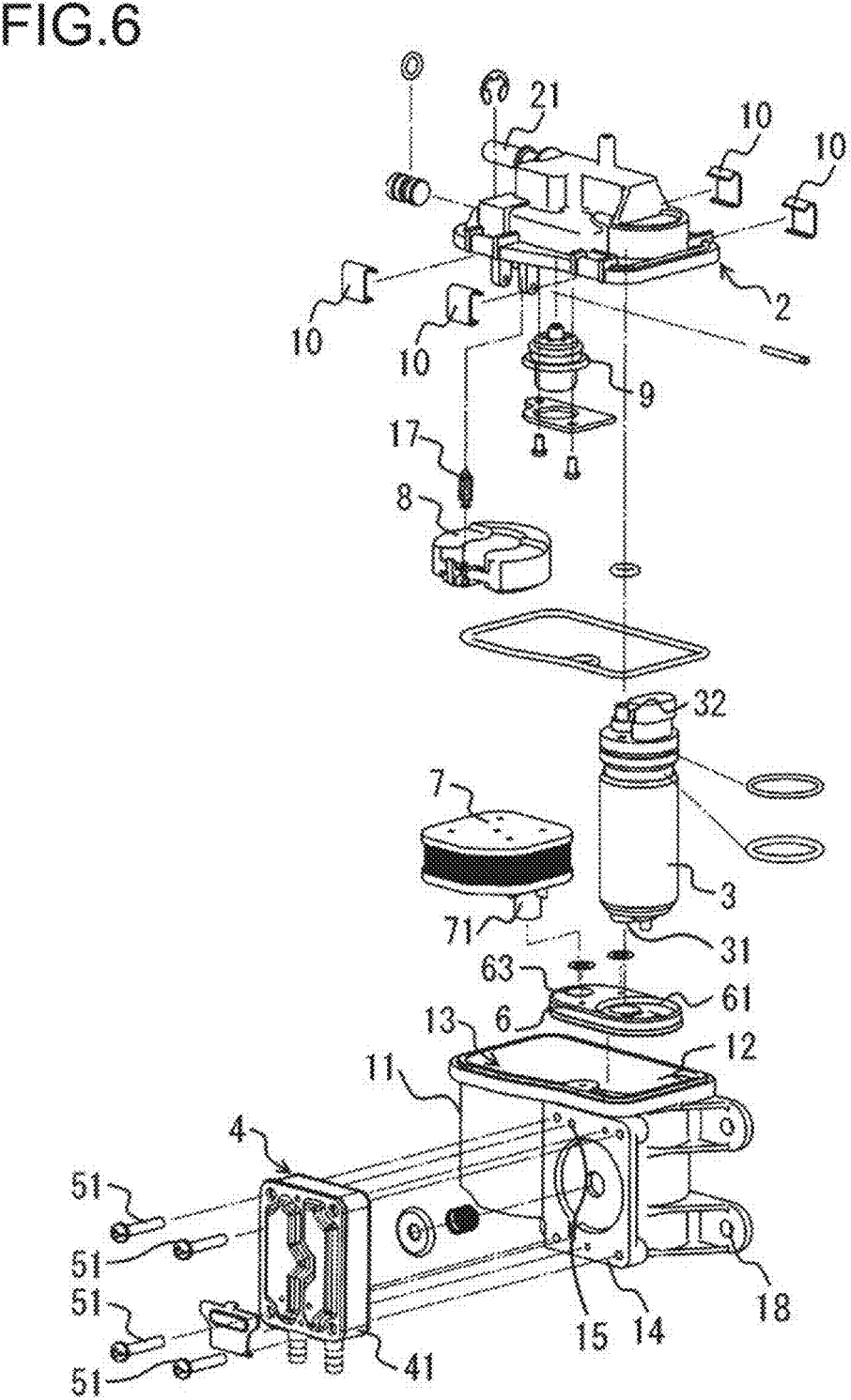
FIG. 6 is an exploded perspective view of the embodiment shown in FIG. 1.
Figure 7:
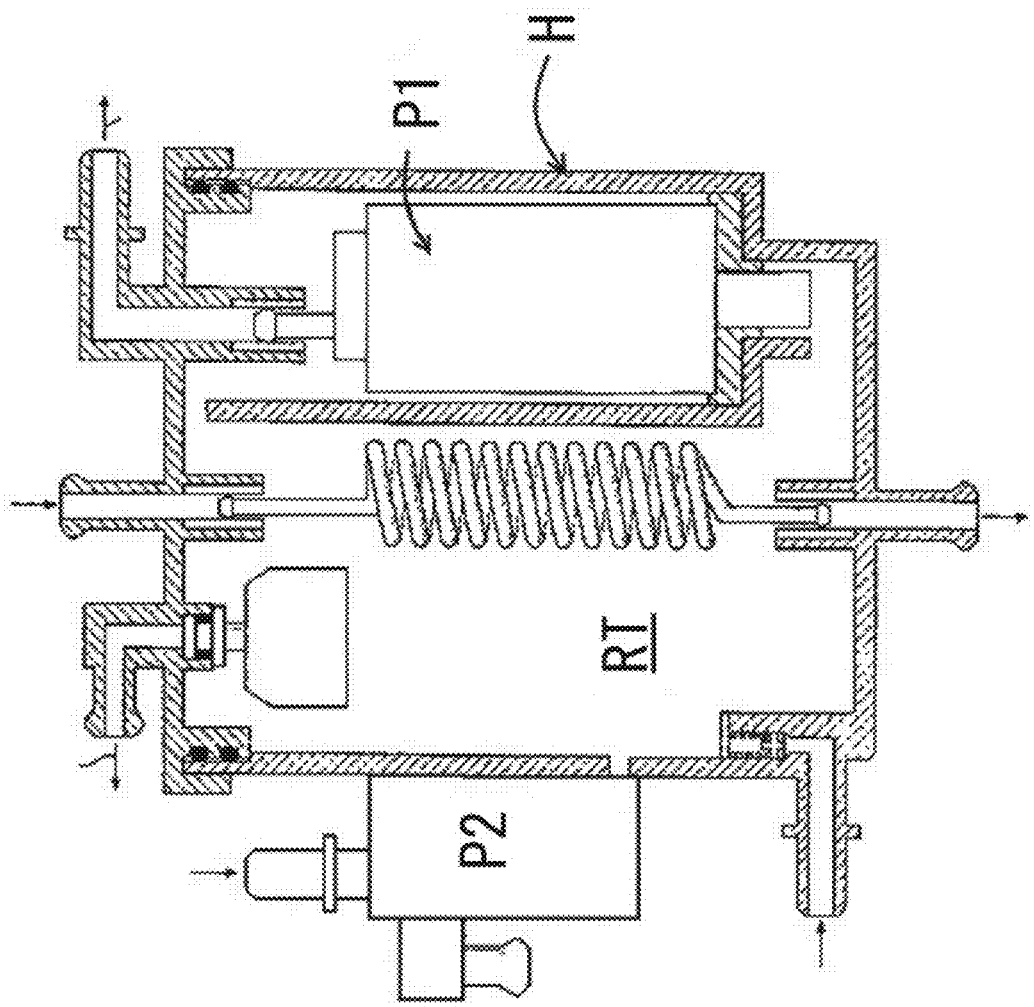
FIG. 7 is a schematic diagram of a conventional fuel supply system.
Figure 8:
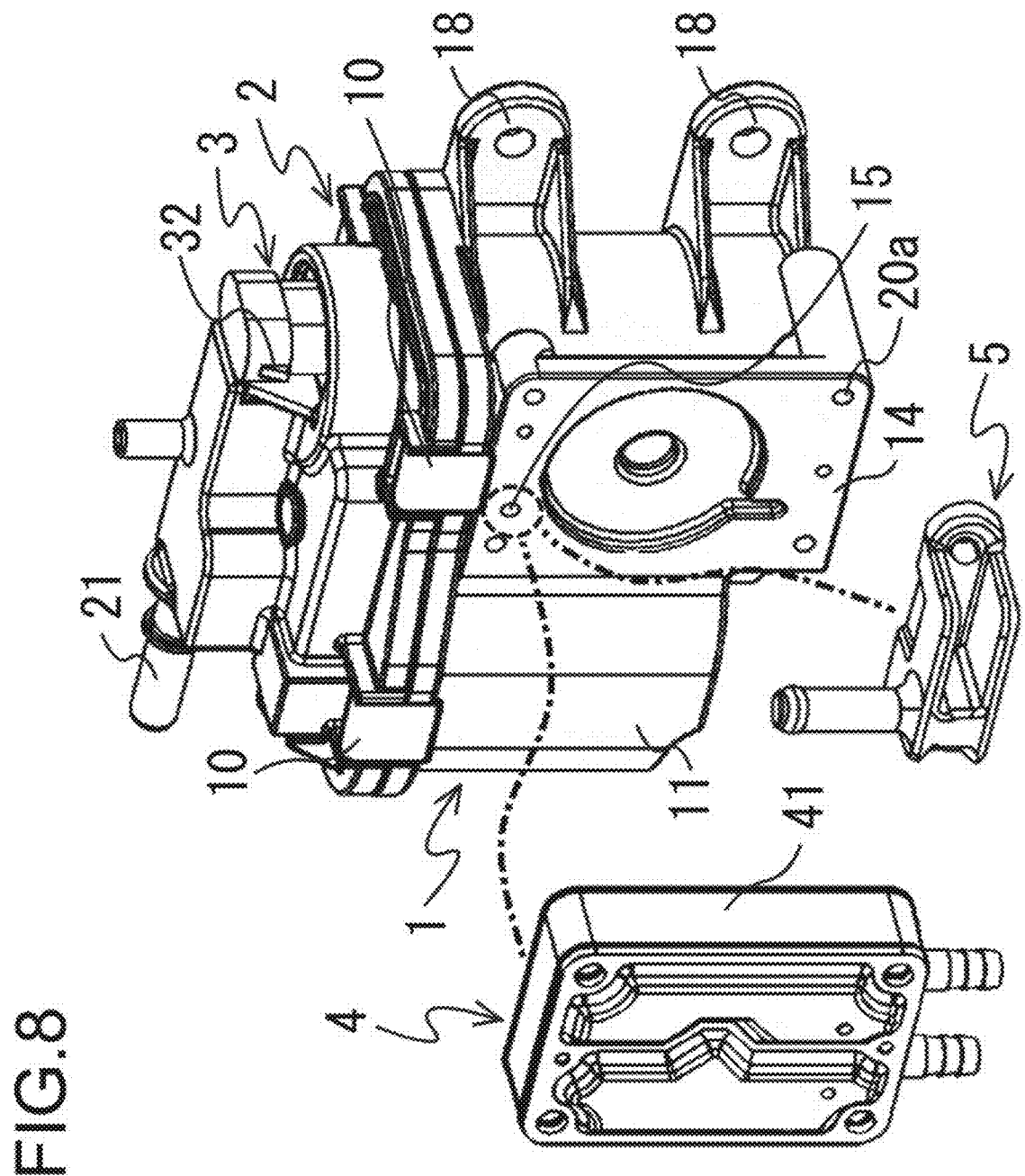
FIG. 8 is a perspective view showing a state that two types of connectors of a first connector and a second connector are removed in a second embodiment showing the fuel supply system of the present invention.

FIGS. 1 to 6 show a first embodiment which is a preferred embodiment of the present invention, and a fuel supply system as the present invention is configured with: a housing 1 which has a lid body 2 airtightly covering an opening 13 of a housing main body 11 having an opening in an upper surface, a bottom, and a fuel storage tank 12 formed therein; a high-pressure pump 3 provided in the housing main body 11 for discharging fuel stored in the fuel storage tank 12 through a fuel discharge pipe 21 formed in the lid body 2; a first connector 4 which is detachably and integrally attached on one wall surface 14 of the housing main body 11 and to which a fuel pipe (not shown) is connected from a fuel tank (not shown) and which have a low-pressure pump 41 constituted by, for example, a low-pressure diaphragm pulse pump for supplying into the fuel storage tank 12 in the housing main body 11; and a second connector 5 which is detachably and integrally attached on the one wall surface 14 of the housing main body 11 and to which a fuel pipe is connected from the fuel tank (not shown) and which have no pump for supplying into the fuel storage tank 12 in the housing main body 11. Note that the low-pressure pump 41 is a pump similar to a conventional low-pressure pump of this type in which a pulsing motion from, for example, a crankcase of the engine is used.

Thus, any one of the first connector 4 and the second connector 5 is selected and used.

In more detailed description, the high-pressure pump 3 is installed to be held by pressure and to be fit in a mounting recess 61 of a holding member 6 which is installed on the bottom part of the housing main body 11, is formed of a resilient material such as synthetic rubber, and has a flow passage 62 on a bottom part thereof communicating with the fuel storage tank 12, such that a suction port 31 provided at the lower end of the high-pressure pump 3 is opened to the flow passage 62 and such that electrode part 32 formed at an upper end of the high-pressure pump 3 sticks out through the lid body 2 so that an electric connection can be made outside the housing 1.

In addition, on another mounting recess 63 which is formed on the holding member 6 and communicate with the flow passage 62, a blitz type filter 7 is also installed such that a feed-out port 71 is opened to the flow passage 62.

Further, in the wall surface 14 of the housing main body 11, a mounting part is formed to detachably attach, with a fixing bolt 51, the first connector 4 having the low-pressure pump 41 or the second connector 5, and there is formed a fuel intake port 15 with which, specifically when the first connector 4 or the second connector 5 is attached, a feed-out port 42 of the low-pressure pump 41 of the first connector 4 or a supply port 52 of the second connector 5 is airtightly fit. In addition, the fuel intake port 15 is positioned at least above a liquid surface of the fuel stored in the fuel storage tank 12, and the fuel intake port 15 communicates with the fuel storage tank 12 through a fuel passage 16 and a valve body 17 which are provided in the housing main body 11 and the lid body 2.

In the lid body 2, there is provided a float 8 for determining a liquid surface position of the fuel stored in the fuel storage tank 12. In the float 8, there is provided a regulator 9, in a penetrating manner, communicating between the fuel storage tank 12 and the fuel discharge pipe 21 which is disposed in the lid body 2 and is connected to a feed-out port 33 of the high-pressure pump 3.

In the present embodiment, the lid body 2 is fixed with a plate-like spring clip 10, and assembly and disassembly are thus easy.

The present fuel supply system having the above configuration is assembled by using any one of the first connector 4 having a low-pressure pump 41 or the second connector 5 having no pump, in accordance with the purpose of use. Of course, the connecter can be replaced with the other connector after once attached.

The assembled present embodiment is fixed to an engine, a vehicle body, or the like (not shown) via a mounting part 18 protrudingly provided on the housing 1. The fuel introduced through the first connector 4 or the second connector 5 from the fuel tank (not shown) is introduced through the fuel intake port 15 formed in the wall surface 14 of the housing main body 11 and further through the fuel passage 16 formed in the lid body 2 and the valve body 17 into the fuel storage tank 12 and is stored up to a predetermined liquid surface by the float 8. At the same time, the high-pressure pump 3 is operated to discharge the fuel in the fuel storage tank 12 through the fuel discharge pipe 21.

FIGS. 8 to 14 show a second embodiment of the present invention, and in the second embodiment, a drain reservoir 19 is formed to be recessed in a bottom part of a fuel storage tank 12 formed in a housing main body 11; and in order to fix, for example, a lower part of a first connector 4 having a low-pressure pump 41, the threaded hole 20a, which is of threaded holes for fixing bolts 51 formed in a wall surface 14 of the housing main body 11 and is formed in a bottom part, and the drain reservoir 19 formed to be recessed in the bottom surface of the housing main body 11 are communicated with each other through a drain passage 20 having a smaller diameter than the threaded hole 20a.

Therefore, drain (water or impurities contained in the fuel) stored in the drain reservoir 19 can be discharge through the threaded hole 20a and the drain passage 20 by pulling out a fixing bolt 51a, whereby the drain stored in the bottom part in the housing main body 11 can be very easily made to discharge from outside of the housing 1.

Figure 9:
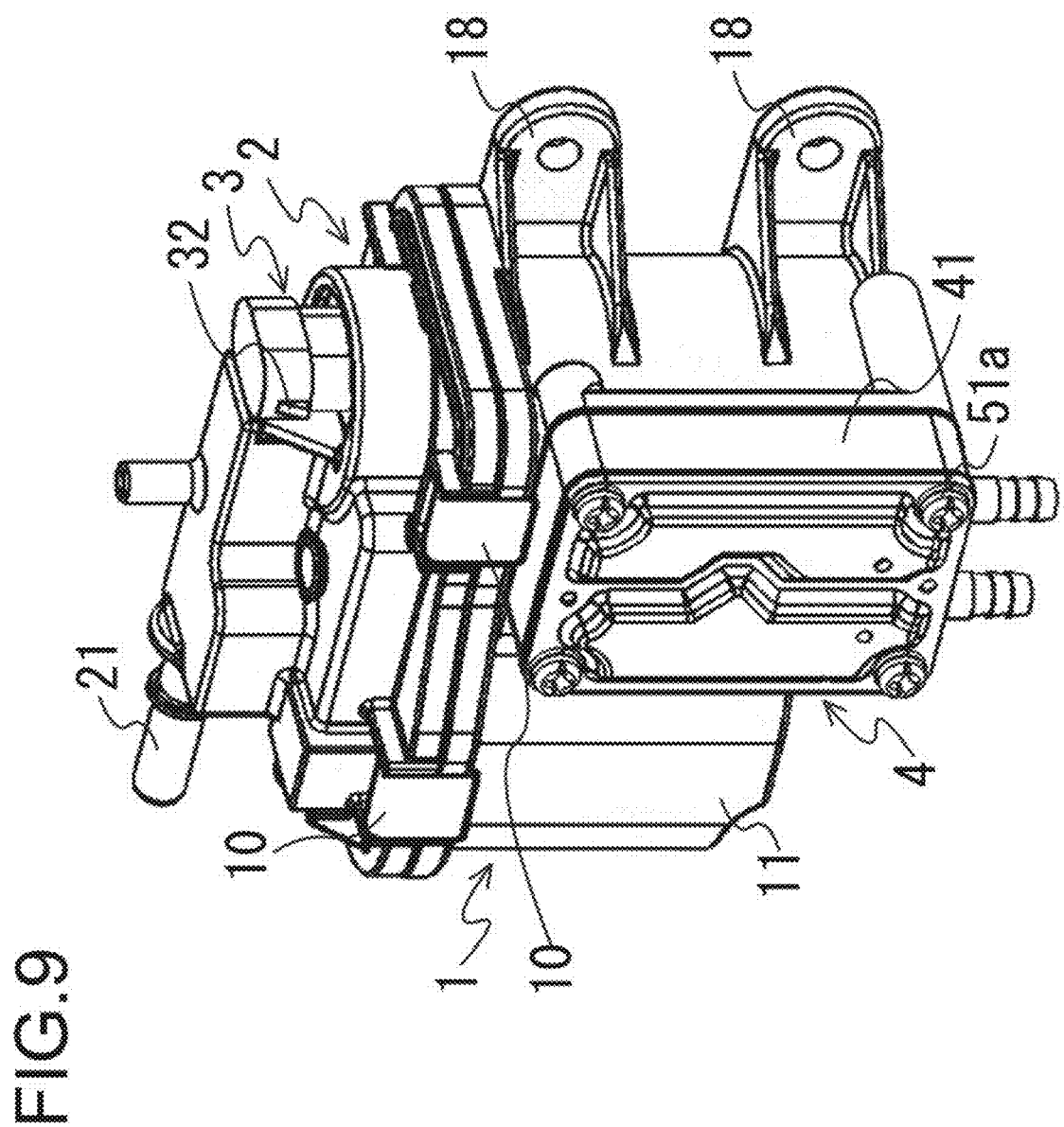
FIG. 9 is a perspective view of a state that the first connector of the embodiment shown in FIG. 8 is attached.
Figure 10:
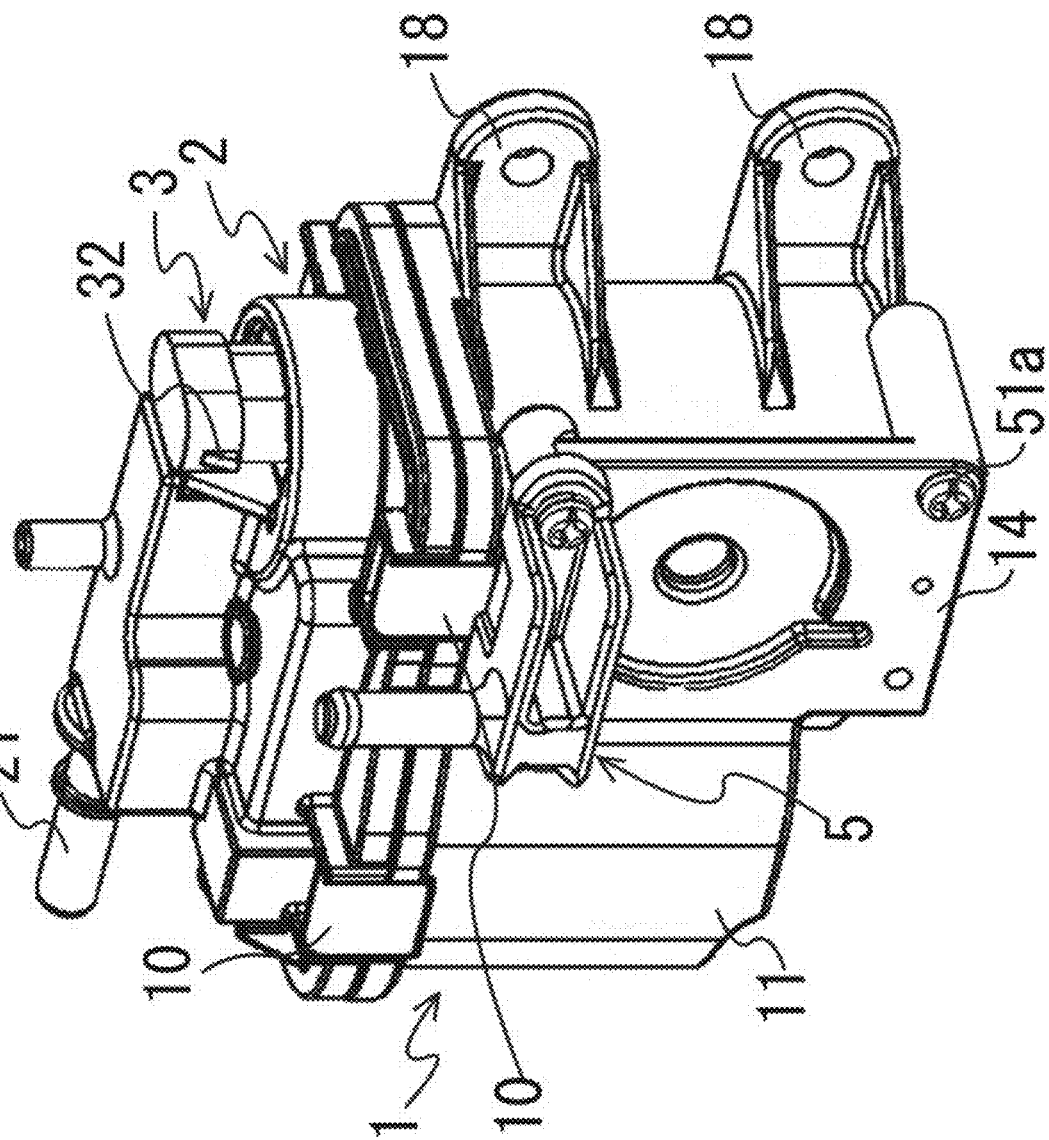
FIG. 10 is a perspective view of a state that the second connector of the embodiment shown in FIG. 8 is attached.
Figure 11:
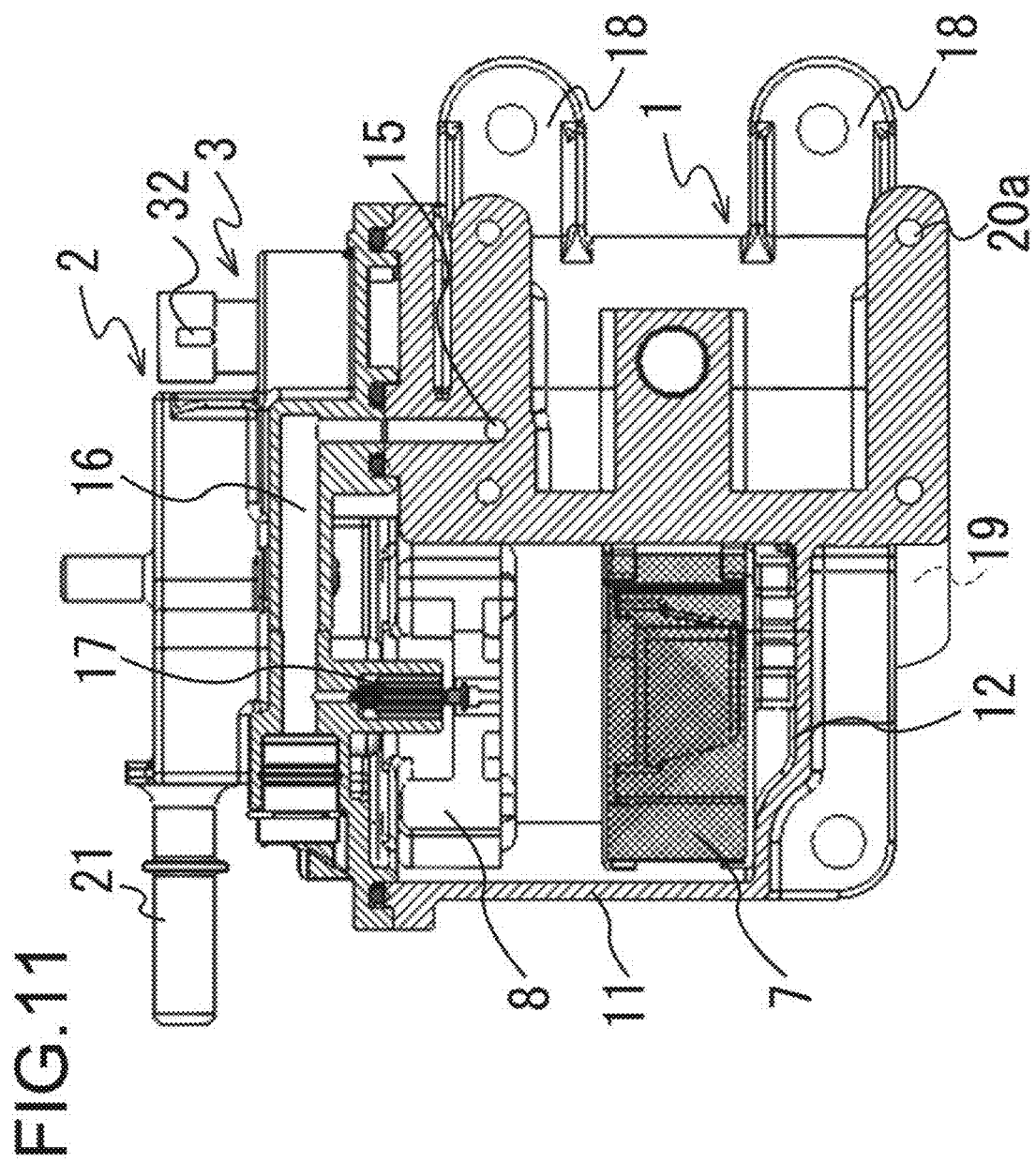
FIG. 11 is a vertical cross-sectional view of the embodiment shown in FIG. 8.
Figure 12:
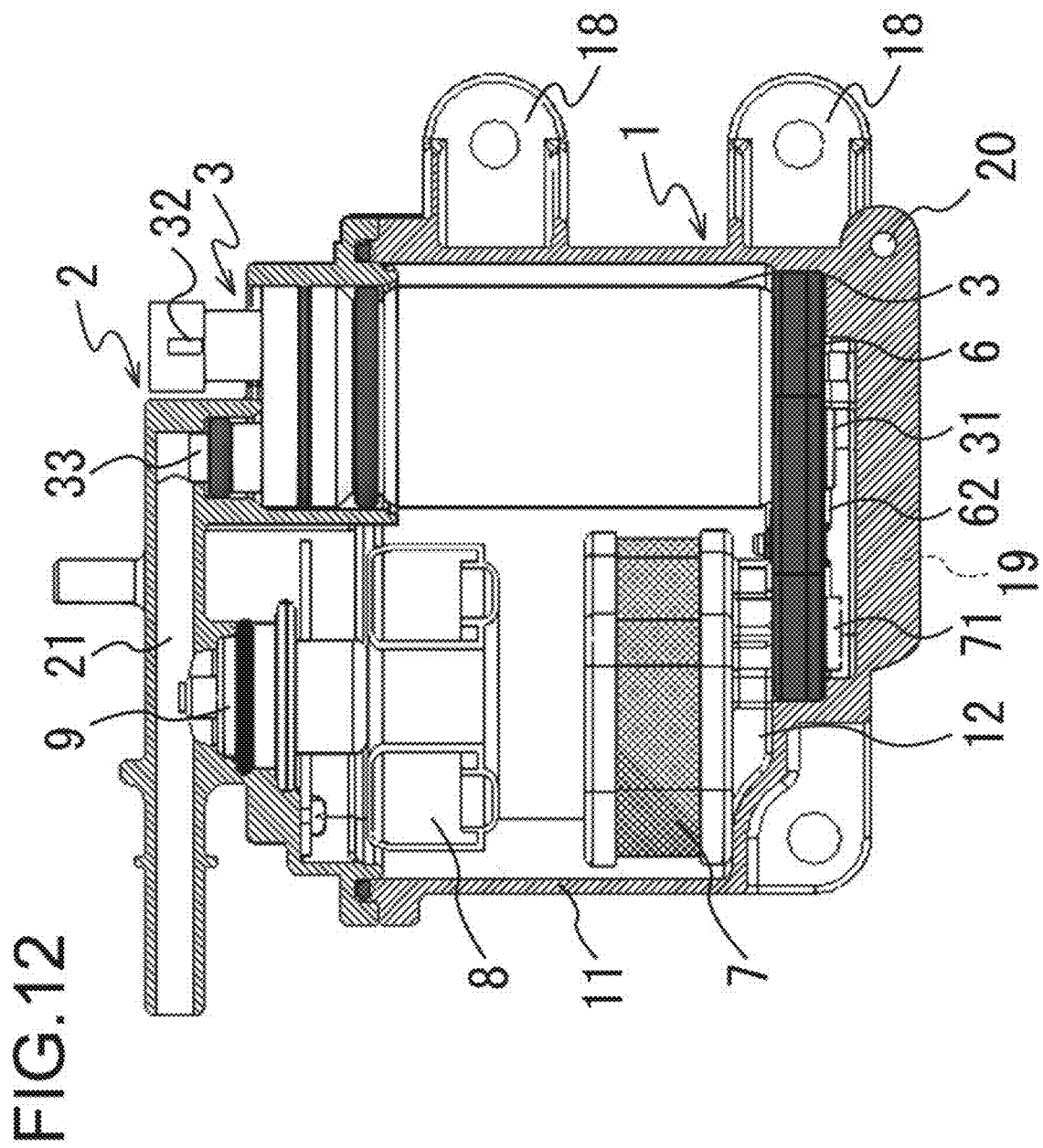
FIG. 12 is a vertical cross-sectional view, at a different position, of the embodiment shown in FIG. 8.
Figure 13:
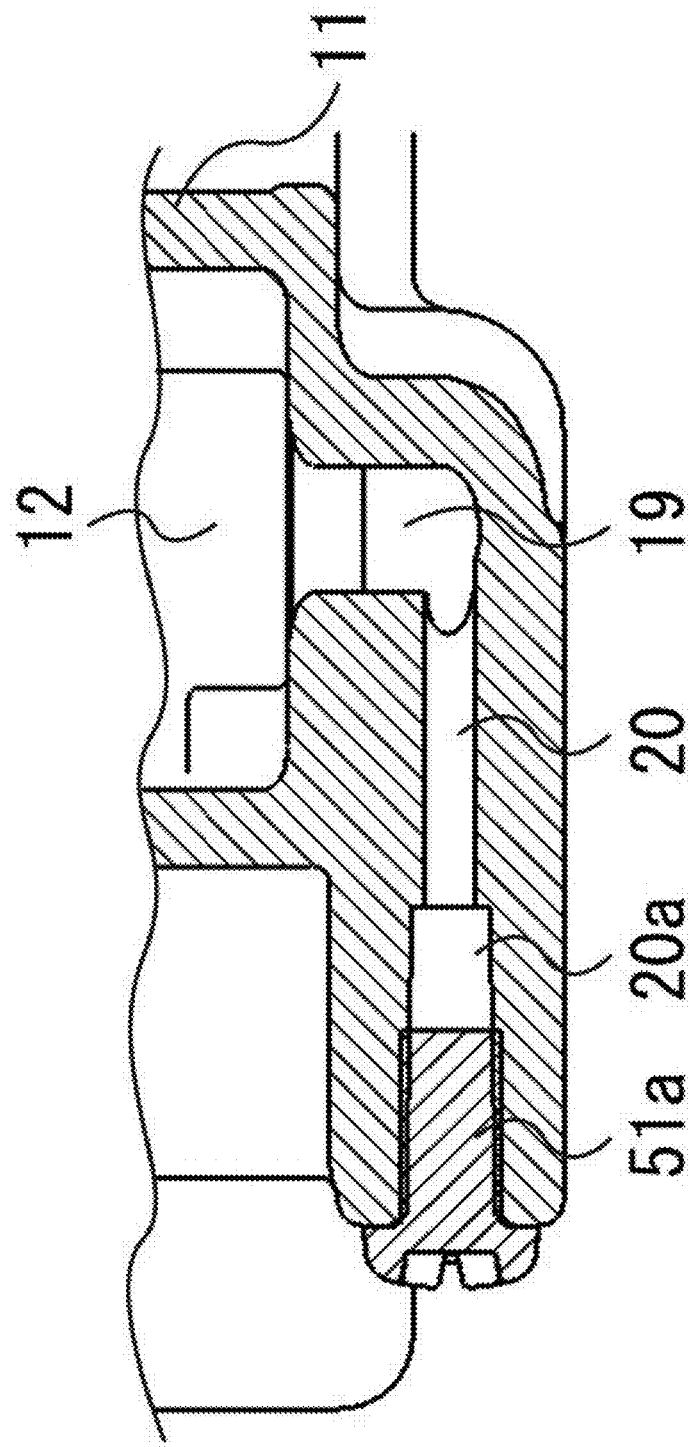
FIG. 13 is a sectional view of a housing bottom part in a state that a drain passage of the embodiment shown in FIG. 8 is formed.

In particular, in the present configuration, in the case that the second connector 5 having no pump as shown in FIG. 10 is used, the fixing bolt 51a can be used only for draining; however, the present configuration can be applied to the case that the first connector 4 having the low-pressure pump 41 shown in FIG. 9 is used.

Figure 14:
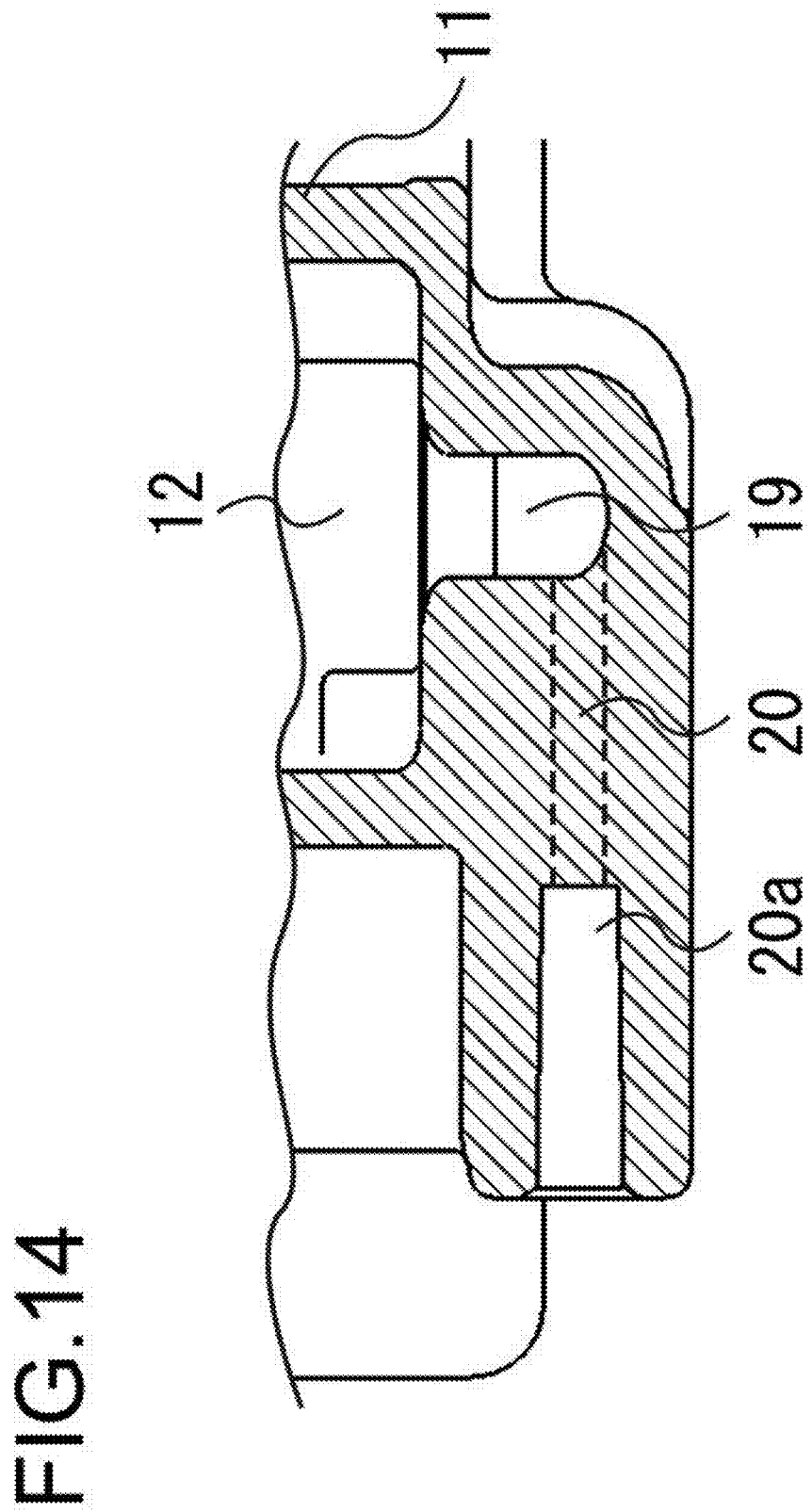
FIG. 14 is a sectional view of the housing bottom part at a state before the drain passage of the embodiment shown in FIG. 8 is formed.
Figure 15:
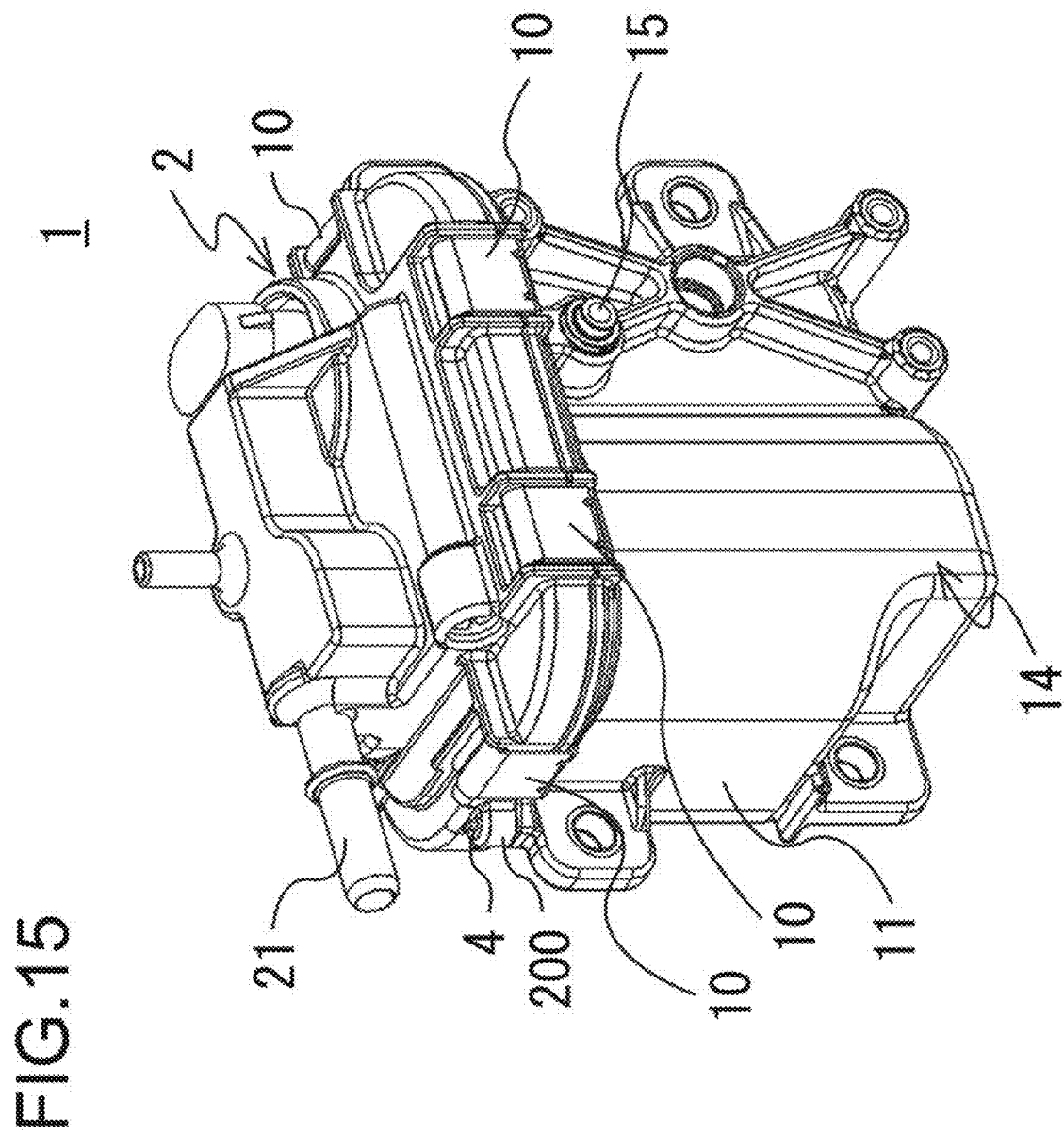
FIG. 15 is a perspective view showing a fuel supply system of the present invention in a third embodiment.
Figure 16:
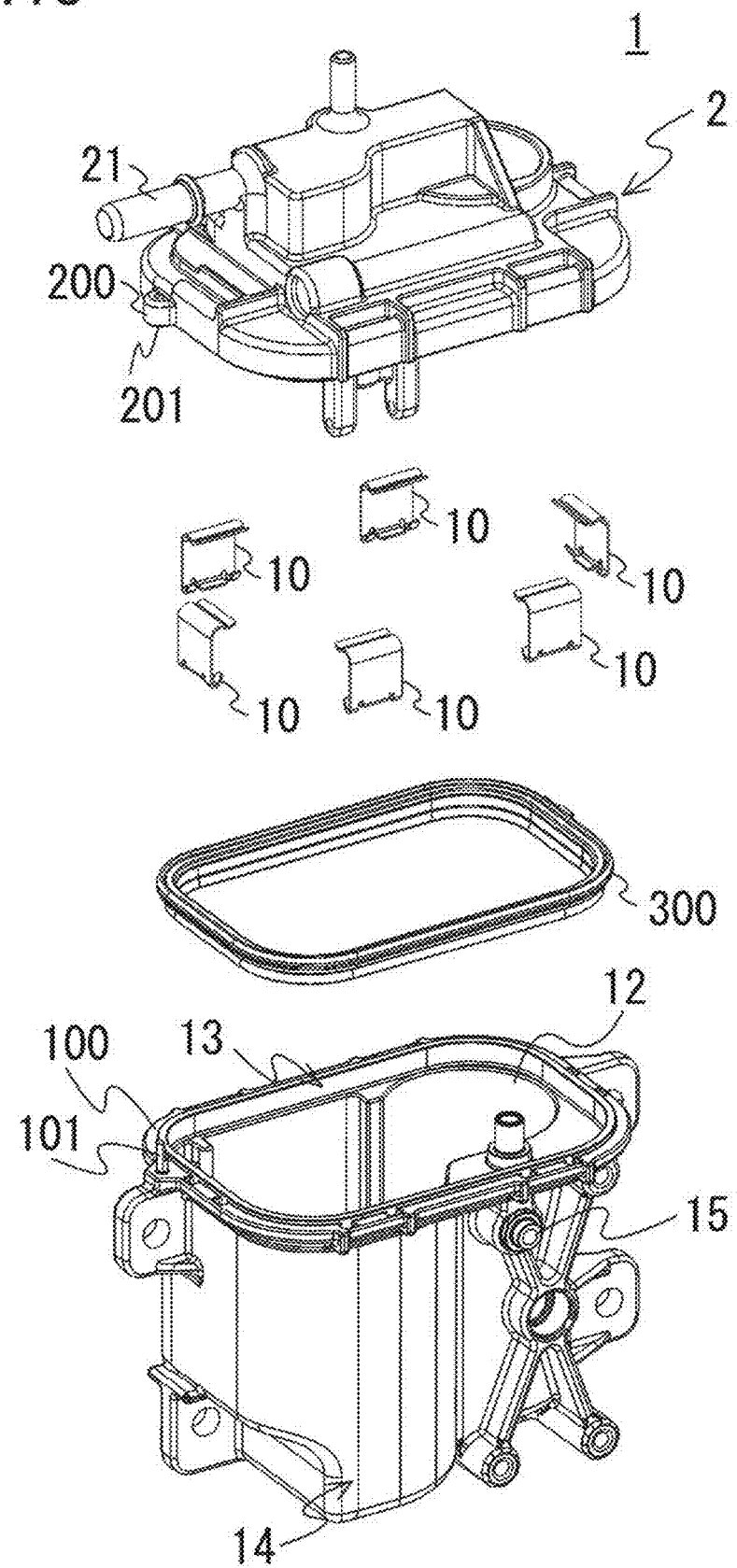
FIG. 16 is an exploded perspective view of the embodiment shown in FIG. 15.

In the second embodiment, the threaded hole 20a for the first connector 4 having the low-pressure pump 41 is made in the wall surface 14 of the housing main body 11 to have a predetermined length in correspondence to the position at which the drain reservoir 19 is formed in the bottom part of the housing main body 11 as shown in FIG. 14, and next the drain passage 20 having a smaller diameter than the threaded hole 20a is easily made by additional machining, and because the drain passage 20 has a smaller diameter than the threaded hole 20a, the function of the threaded hole 20a is never impaired.

FIGS. 15 to 19 show a third embodiment of the present invention. In the third embodiment, a housing 1 has: a housing main body 11 in which a fuel storage tank 12 is formed; and a lid body 2 which hermetically covers an opening 13 of the housing main body 11 through a packing 300 by using spring clips 10. In the housing 1, a positioning pin 101 is integrally provided protrudingly at a predetermined position on an opening edge 100 of the housing main body 11, and a positioning hole 201 which fits the positioning pin 101 is formed on a flange 200 of a lid body 2 which is in contact with and opposed to the opening edge 100 of the housing.

Therefore, a positioning hole 201 formed in the lid body 2 is inserted into the positioning pin 101 protrudingly provided in the opening edge 100 of the housing main body 11, in a process of putting the lid body 2 on the housing main body 11, so that the lid body 2 is mounted at a predetermined position of the housing main body 11.

Next, the lid body 2 is fixed on the housing main body 11 with separately provided fixing devices, for example, spring clips 10, and the positioning pin 101 protrudingly provided on the opening edge 100, of the housing main body 11, protruding from the positioning hole 201 formed in the lid body 2 as shown in FIG. 17(a) is caulked as shown in FIG. 18(a), whereby a swelling caulked part 105 is generated to seal.

With the third embodiment, it goes without saying that sealing can be easily and surely done, and because the positioning pin 101 protrudingly provided on the housing main body 11 is fixed at a predetermined fitting position, the action of fixing the lid body 2 on the housing main body 11 can also be realized.

Then, if the lid body 2 is intentionally opened after being sold, the caulked part 105 should be broken; thus, it is easy to check that the lid body 2 was opened, and if the lid body 2 was opened and the caulked part 105 was broken, it is impossible to caulk again.

Figure 18B:
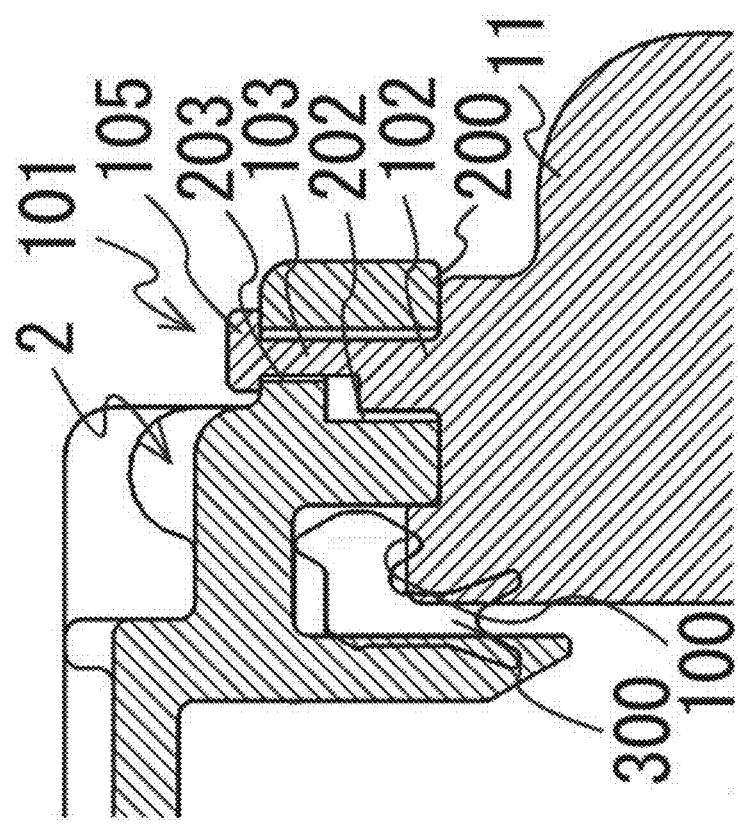
FIG. 18(b) is a diagram showing a partial sectional view of the main part after the positioning pin in the embodiment shown in FIG. 15 is caulked.
Figure 19:
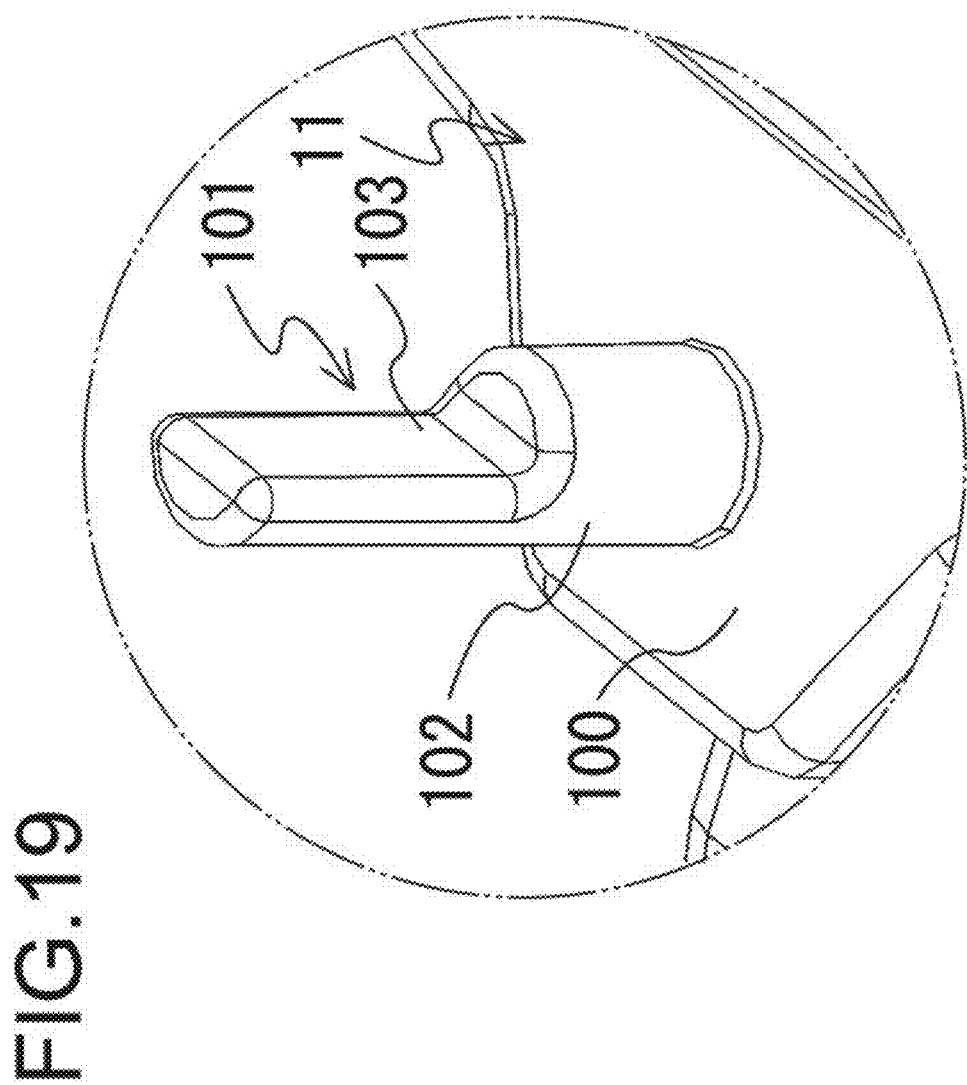
FIG. 19 is an enlarged perspective view showing the positioning pin of the embodiment shown in FIG. 15.
Figure 20:
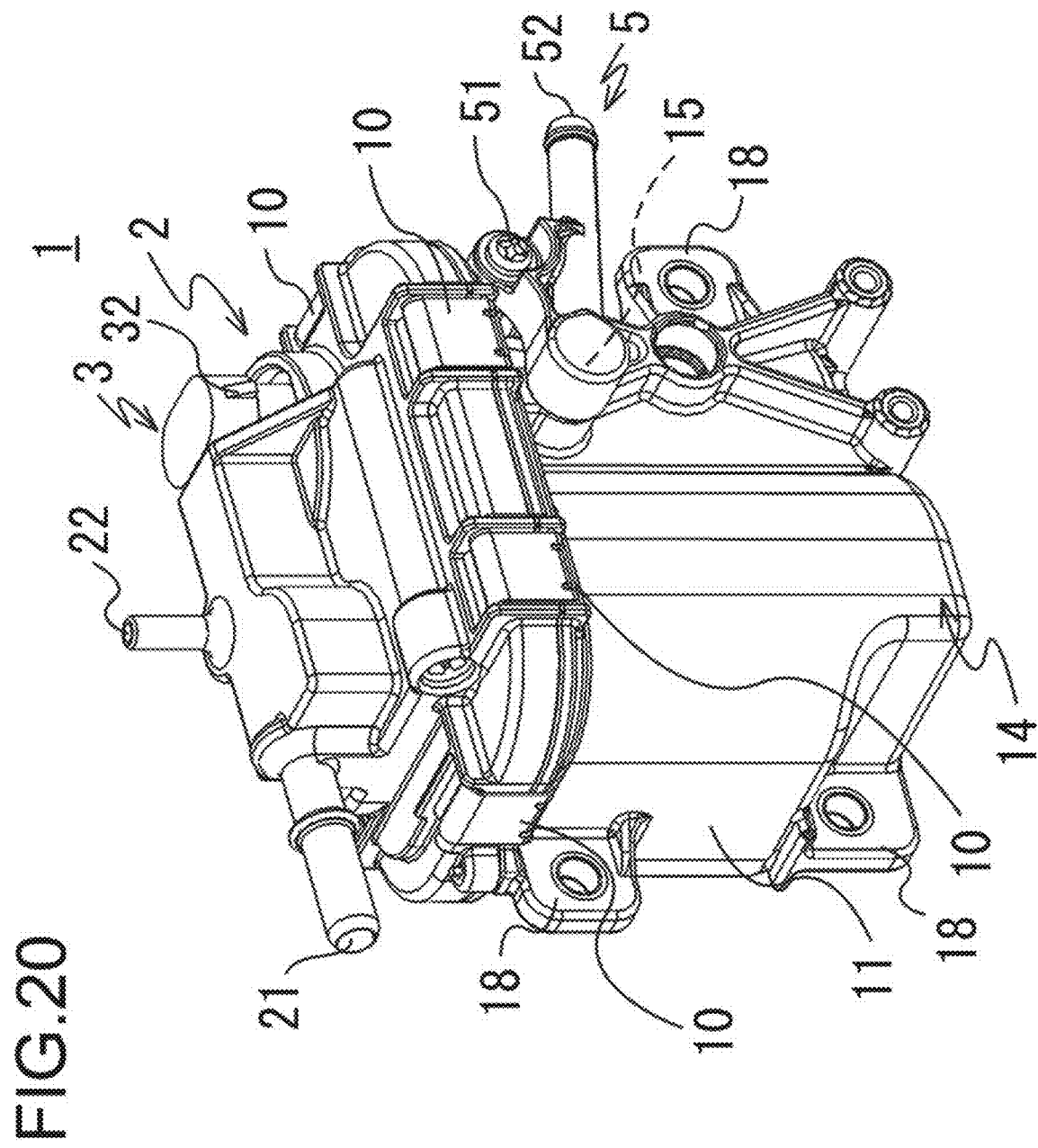
FIG. 20 is a perspective view of a fourth embodiment showing a fuel supply system of the present invention.
Figure 21:
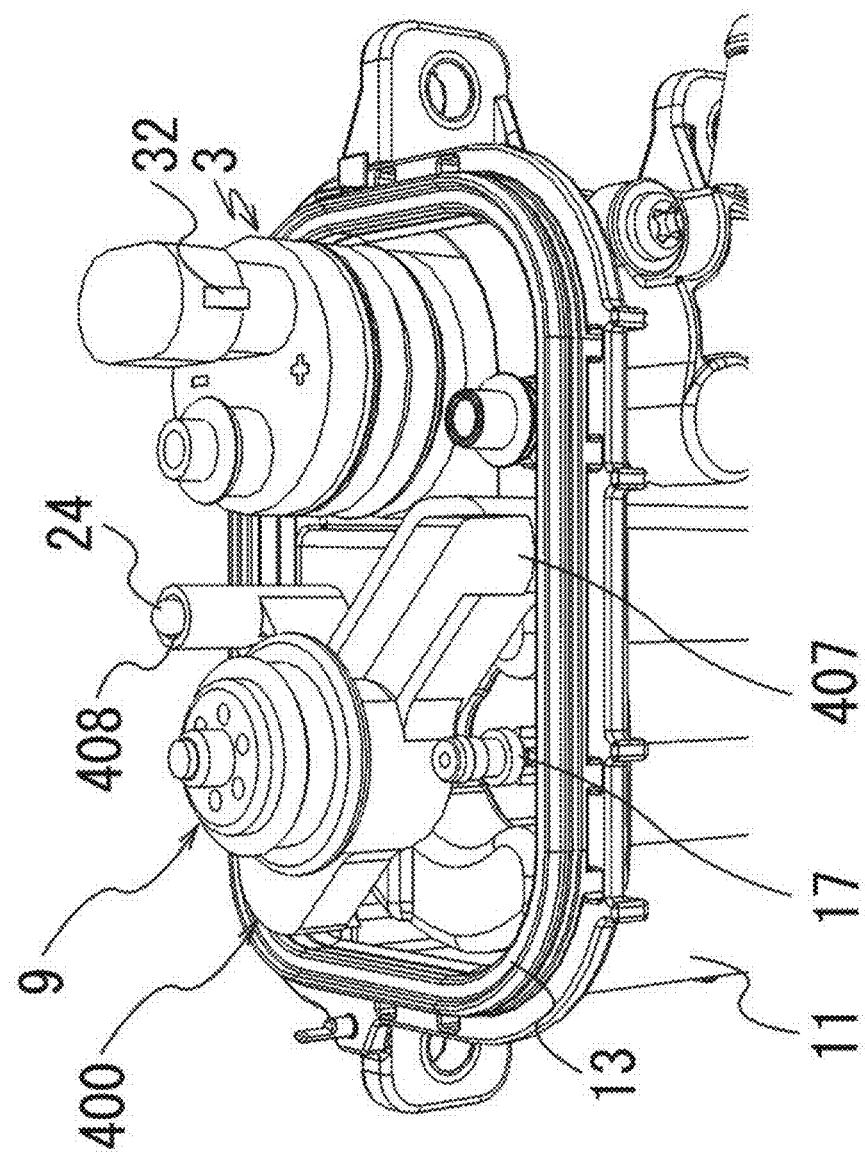
FIG. 21 is a perspective view of the embodiment shown in FIG. 20 in a state the lid body is removed.

In addition, as shown in FIG. 19, the positioning pin 101 is constituted of a large diameter part 102 formed on a base end side and a small diameter part 103 formed on a tip side from the base end side, and in the positioning hole 201 in which the positioning pin 101 is fit, there are continuously formed a large diameter part 202 and a small diameter part 203 to fit the positioning pin 101 as shown in FIG. 17(b) and FIG. 18(b), and the two parts having the different diameters surely fit and support, whereby the lid body 2 can be surely disposed at an accurate position.

In particular, in the third embodiment, the large diameter part 102 of the positioning pin 101 has a circular cross-section, and the small diameter part 103 formed on the tip side from the large diameter part 102 has a semi-circular cross-section in which the large diameter part is cut away by a half of a diameter of the large diameter part for a predetermined height in the vertical direction; thus, the large diameter part 102 and the small diameter part 103 can be previously formed by integrally molding, however, may be formed by other processing methods such as cutting work.

In addition, in the third embodiment, because central axial lines of the large diameter part 102 and the small diameter part 103 constituting the positioning pin 101 and central axial lines of the large diameter part 202 and the small diameter part 203 of the positioning hole 201 are out of alignment, the lid body 2 can be disposed at a very precise position.

Note that caulking is performed by using conventional well-known method such as hitting or the like when the positioning pin 101 is made of metal, and thermal melting method when the positioning pin 101 is made of synthetic resin; therefore, the material does not need to be specifically limited.

Further, the third embodiment describes the case that the positioning pin 101 is formed on the housing main body 11 and the positioning hole 201 is formed in the lid body 2; however, it goes without saying that, to the contrary, the third embodiment can be similarly practiced in the case (not shown) that the positioning pin 101 is formed on the lid body 2 and the positioning hole 201 is formed in the housing main body 11.

Still further, in the third embodiment, fixing effect of the lid body 2 can be improved by caulking the positioning pin 101, and when the number of the positioning pin 101 is increased, not only is the positioning accuracy of the lid body 2 on the housing main body 11 is improved, but also the fixing effect is improved. Therefore, the positioning pin 101 can be used as a fixing device, for example.

FIGS. 20 to 26 show a fourth embodiment of the present invention, and a fuel supply system in the present embodiment has: a housing 1 having a lid body 2 which hermetically covers an opening 13 of a housing main body 11 which has a bottom and the opening 13 on an upper surface and in which a fuel storage tank 12 is formed; a fuel pump (high-pressure pump) 3 which takes in fuel stored in the fuel storage tank 12 disposed in the housing main body 11 from a suction port 31 through a filter 7 and discharges the fuel from a fuel discharge pipe 21 formed on the lid body 2 of the housing main body 11; and a connector (second connector) 5 which is integrally and detachably mounted on one wall surface 14 of the housing main body 11 and has a supply port 52 for supplying the fuel into the fuel storage tank 12 of the housing main body 11 through a fuel pipe (not shown) connected to a fuel tank (not shown).

Note that, the fuel pump (high-pressure pump) 3 is disposed such that electrode parts 32 formed on the upper end of the fuel pump (high-pressure pump) 3 are protruded from the lid body 2 to be able to be electrically connected outside the housing 1.

In addition, on the wall surface 14 of the housing main body 11, the connector (second connector) 5 is detachably mounted with fixing bolts 51, and the fuel is supplied to the fuel storage tank 12 from a fuel intake port 15 disposed above at least a liquid surface of the fuel stored in fuel storage tank 12.

Further, in the fuel storage tank 12, there is disposed a float 8 which has a mechanism for determining the liquid surface position of the fuel stored in fuel storage tank 12, and the float 8 is swingably attached with a hinge 81 disposed, on the inner wall surface of the lid body 2, at a position above an inner wall surface 121 of the fuel storage tank 12.

Still further, in the fuel storage tank 12, a holding member 400 disposed above the float 8 in the fuel storage tank 12 holds a regulator 9 in which pressure regulating ports 92 are connectingly provided on the upper part of a pressure regulating unit main body 91 containing therein a pressure regulating member (not shown) and in which a return port 93 is connectingly provided at the lower part of the pressure regulating unit main body 91, wherein the pressure regulating ports 92 are being connected to the fuel discharge pipe 21 on the lid body 2 of the housing main body 11.

Figure 22:
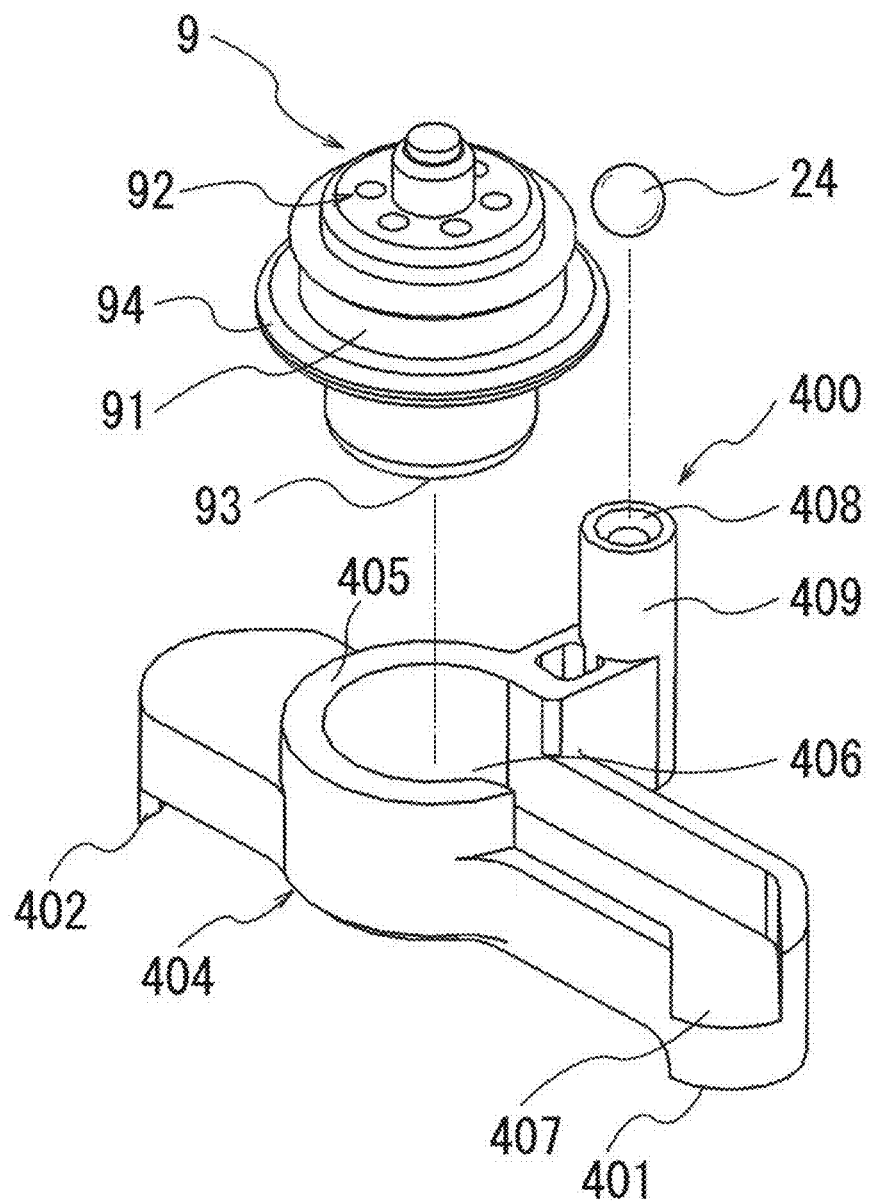
FIG. 22 is a perspective view of a regulator and a holding member for the regulator used in the embodiment shown in FIG. 20.
Figure 23:
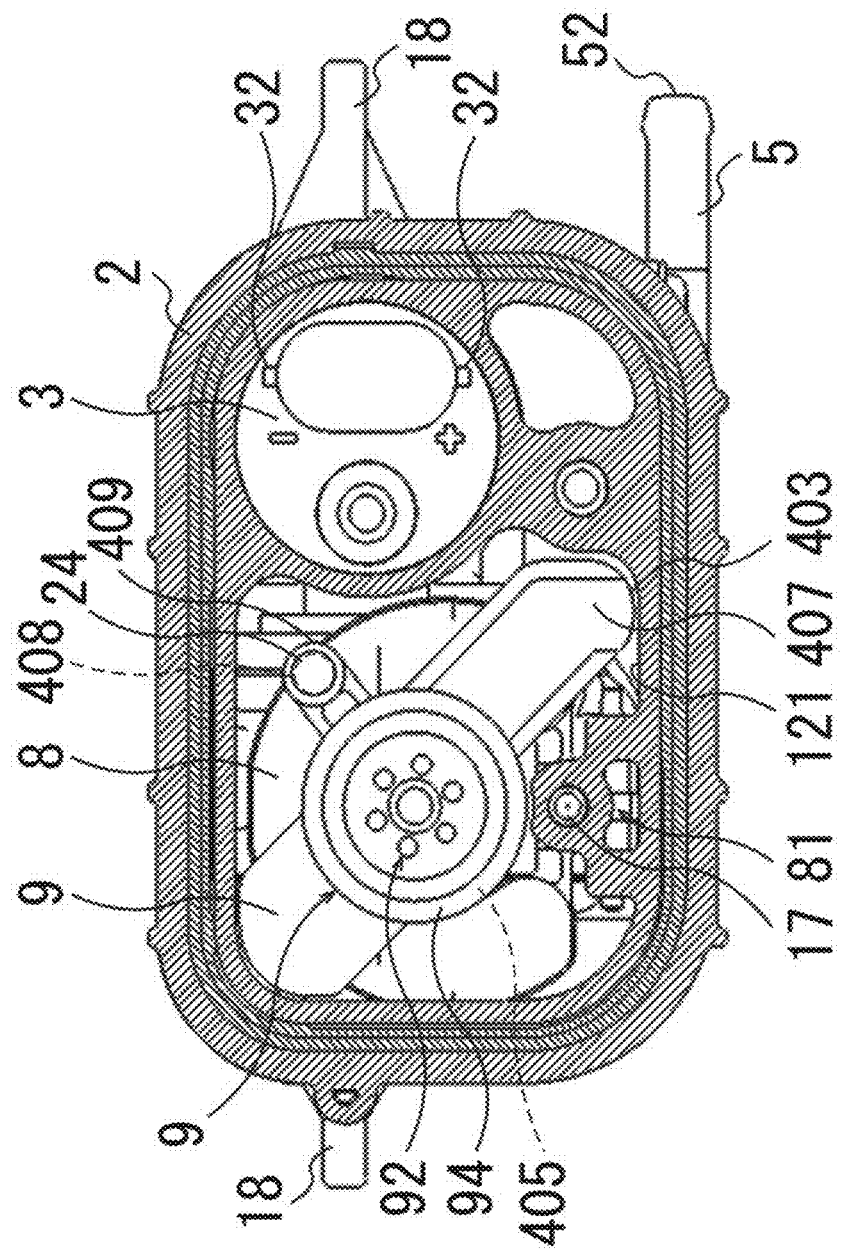
FIG. 23 is a transverse sectional view at a lower part of the lid body in the embodiment shown in FIG. 20.
Figure 24:
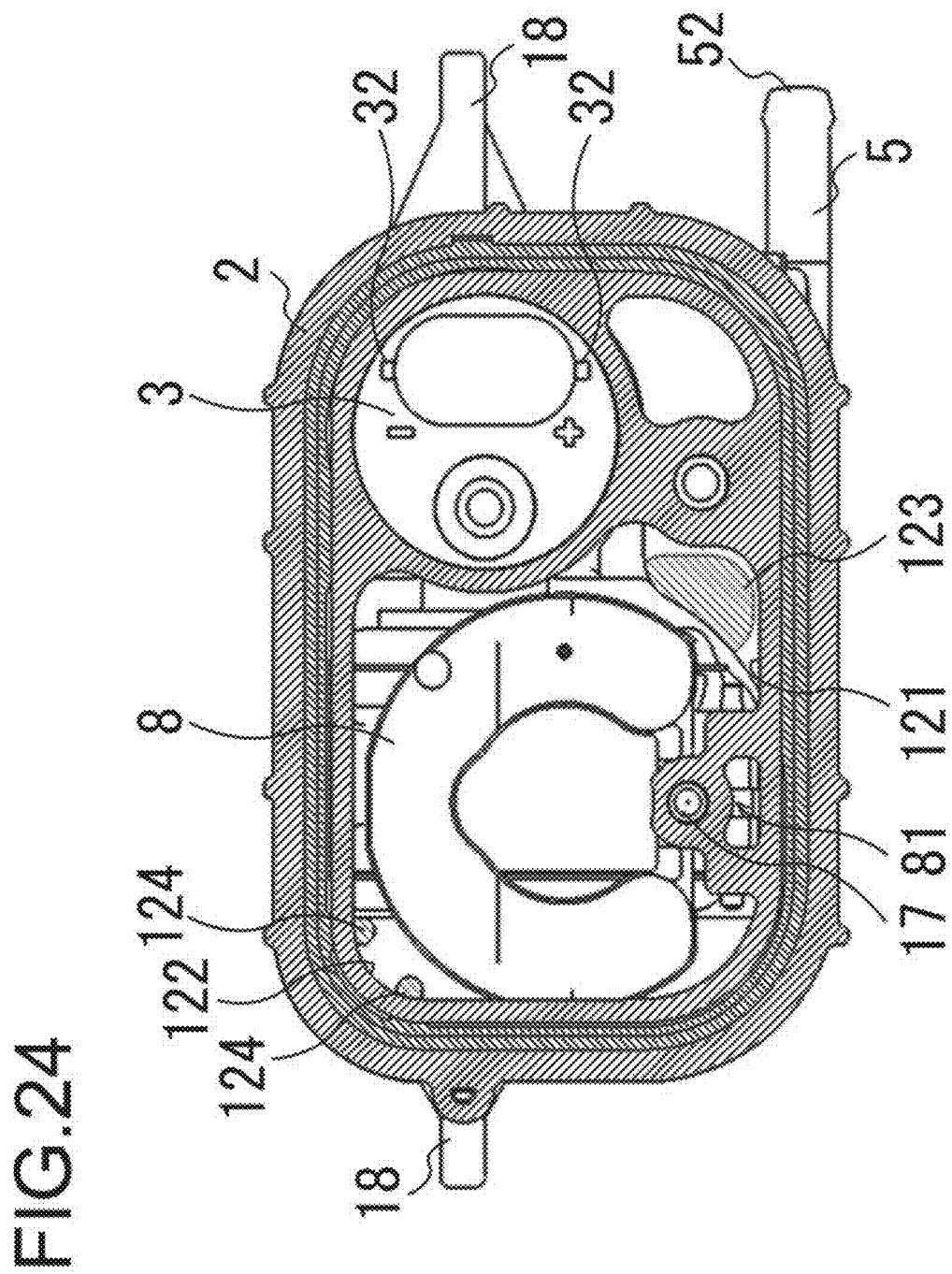
FIG. 24 is a transverse sectional view in a state that the holding member and the regulator are removed in FIG. 23.
Figure 25:
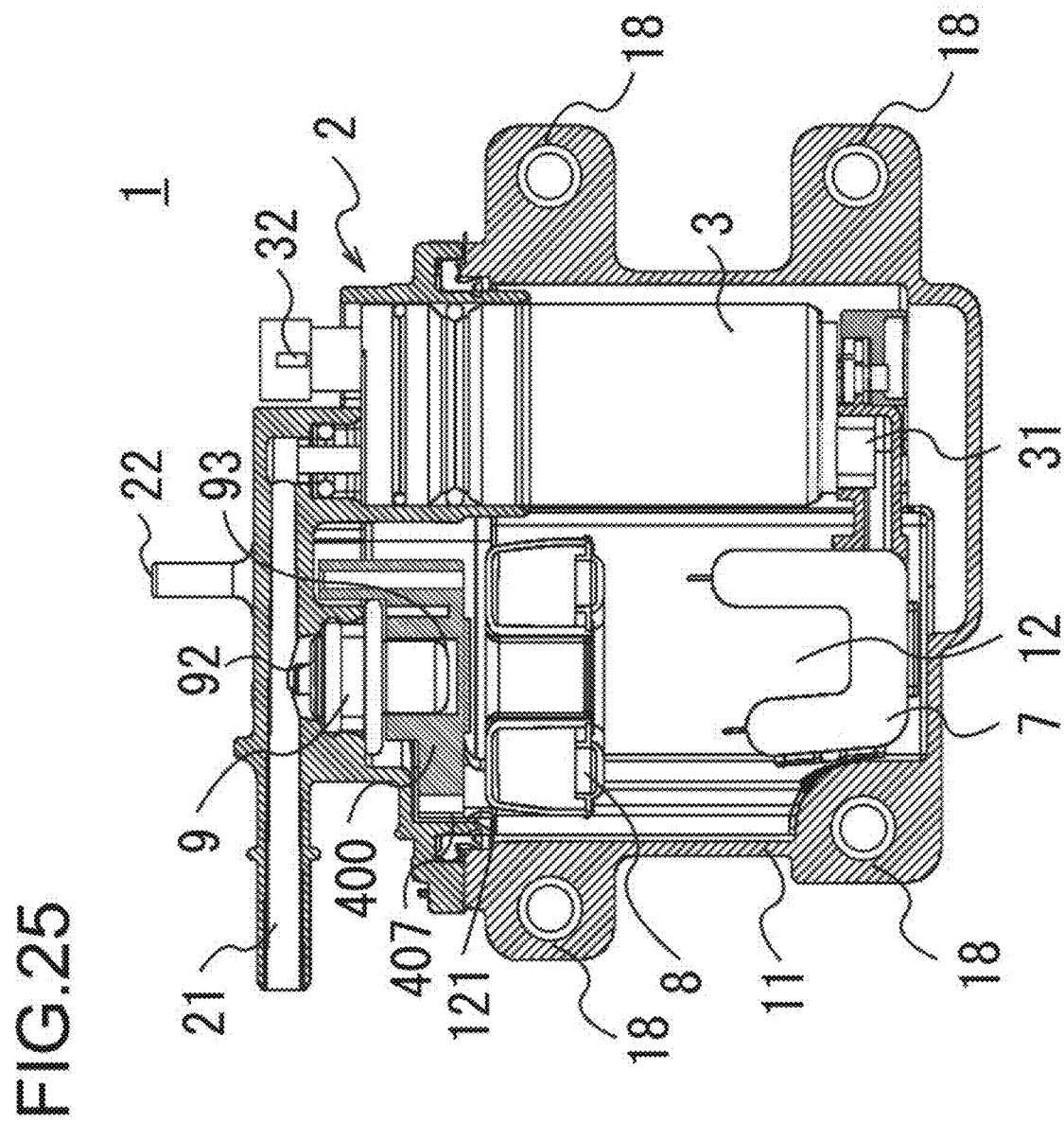
FIG. 25 is a vertical cross-sectional view of the embodiment shown in FIG. 20.

In more detail, a holding member 400 holding a regulator 9 used in the present embodiment has the holding member main body 404 which is in an arched shape as a whole and has leg parts 401 and 402 protrudingly provided on lower surfaces of both ends of the holding member main body 404 as shown in FIG. 22, the leg parts 401 and 402 being configured to be placed on support plates 123 and 124 each of which is protrudingly provided on each of mutually opposing inner wall surfaces 121 and 122 of the fuel storage tank 12. The holding member main body 404 has a length long enough for at least one end part 403 thereof to be close to the inner wall surface 121 of the fuel storage tank 12. On a part of a surface of the holding member main body 404, there is formed on an upper end surface a receiving surface 405 on which a holding flange 94 protrudingly provided on a circumferential wall of the pressure regulating unit main body 91 of the regulator 9, and a regulator receiving part 406 made up of a recessed part for holding the regulator 9 with a space (not shown) between the regulator receiving part 406 and the recessed part of the return port 93 of the regulator 9; and an extra fuel discharge passage 407 in a gutter shape communicating with the space of the regulator receiving part 406 is formed in the surface of the holding member main body 404 from the regulator receiving part 406 to the end part 403 close to the inner wall surface 121 of the fuel storage tank 12.

In the embodiment having the above configuration is assembled such that the lid body 2 is fixed on the housing main body 11 with the plate-like spring clips 10, and is used being fixed on an engine, a vehicle body, or the like (not shown) through the mounting part 18 protrudingly provided on the housing 1; the fuel from the fuel tank (not shown)

flows into fuel storage tank 12 through the connector (second connector) 5 mounted on the wall surface 14 of the housing main body 11 with the fixing bolts 51 as described above, is led into the fuel storage tank 12 through a fuel tank (not shown) and a valve body 17 disposed in the lid body 2, and is then stored up to a predetermined liquid surface by the float 8; and the fuel pump (high-pressure pump) 3 concurrently operates to discharge the fuel in the fuel storage tank 12 from the fuel discharge pipe 21.

Thus, when a fluid pressure in a fuel supply pipe 2 is higher than a predetermined value, the regulator 9 operates to flow extra fuel from pressure regulating ports 92 connected to the fuel supply pipe 2 to the return port 93 so that the extra fuel is returned into the fuel storage tank 12; thus, the fuel at a predetermined pressure is supplied to the engine. In this operation, because the regulator 9 is held on a novel holding member 400 in the present embodiment, the fuel does not directly flow down to the liquid surface of the fuel as in conventional arts, whereby the liquid surface is not disturbed.

That is to say, in the present embodiment, the extra fuel flowing out from the return port 93 of the regulator 9 does not directly go down on the liquid surface of the fuel stored in the fuel storage tank 12 as in conventional arts, but the extra fuel is stored, returning from the regulator receiving part 406 of the holding member 400 through the extra fuel discharge passage 407 and along the inner wall surface 121 of the fuel storage tank 12 from the end part 403, whereby there is no chance for the extra fuel flowing down from the regulator 9 to disturb the liquid surface, and as a result, the supply of fuel from the fuel pump (high-pressure pump) 3 does not become unstable due to the disturbance of the liquid surface. In addition, in the present embodiment, because the extra fuel flows down along the inner wall surface 121 on the hinge 81 side which affects less the oscillation of the float 8, the float 8 is not likely to oscillate, whereby supply can be more stable.

In addition, in the present embodiment, because the holding member 400 has an arched shape as a whole, the holding member 400 is therefore strong against load, and because the holding member 400 has the receiving surface 405 on which the holding flange 94 protrudingly provided on the circumference of the pressure regulating unit main body 91 of regulator 9 is placed, the holding member 400 can surely support the regulator 9.

Figure 26:
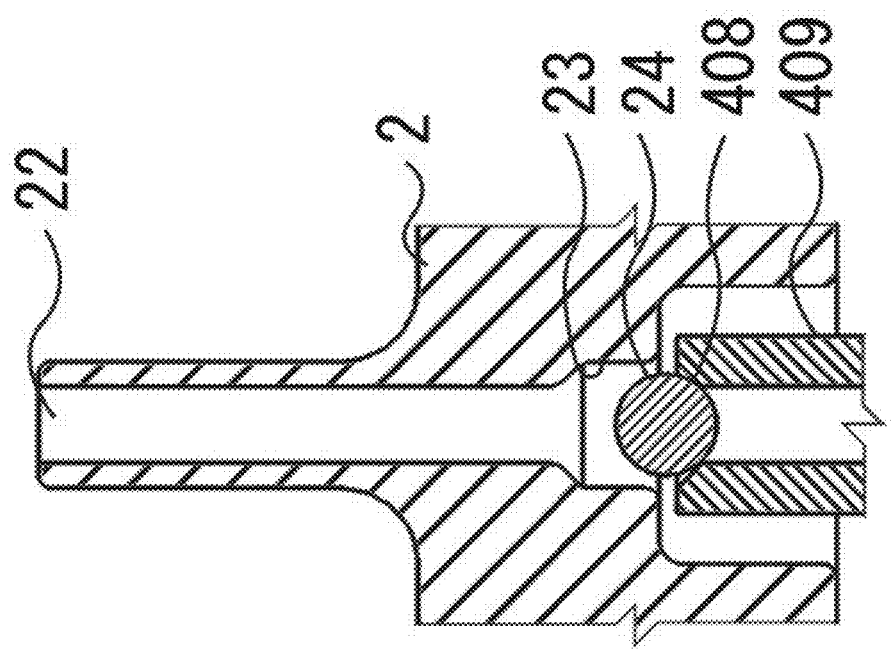
FIG. 26 is a vertical cross-sectional view of a vicinity of a communication passage which is formed in the lid body and open to atmospheric air in the embodiment shown in FIG. 20.

Further, in the present embodiment, as shown in FIG. 26, in the holding member 400, on the holding member main body 404, there is a supporting shaft 409 which has a predetermined height and is erected in correspondence to the position of a communication passage 22 which is formed in the lid body 2 and open to atmospheric air; and on a tip surface of the supporting shaft 409, there is formed a receiving surface 408 for receiving a ball 24 which is used as a stopper and is inserted in an engaging recessed part 23 formed in a base end of the communication passage 22.

With this arrangement, in a case that the housing 1 is laterally overturned, the ball 24 used as a stopper disposed on the receiving surface 408 closes the communication passage 22 open to atmospheric air so as to prevent the fuel stored in the fuel storage tank 12 from spilling out.

The invention claimed is:

1. A fuel supply system comprising:
a housing including a lid body airtightly covering an opening formed in an upper surface of a housing main body which forms a fuel storage tank and which doubles as a reservoir, the housing including, in a sidewall of the housing main body, a fuel intake port communicating with the fuel storage tank;
a high-pressure pump provided in the housing main body to supply fuel stored in the fuel storage tank to an engine through a fuel discharge pipe;
a float which has a mechanism for determining the liquid surface position of the fuel stored in the fuel storage tank;
a regulator in which pressure regulating ports are connectingly provided on the upper part of a pressure regulating unit main body containing therein a pressure regulating member and in which a return port is connectingly provided at the lower part of the pressure regulating unit main body, wherein the pressure regulating ports are being connected to the fuel discharge pipe on the lid body of the housing main body, wherein the pressure regulating unit main body includes a circumferential wall with a holding flange protruding therefrom;
a holding member which is in an arched shape as a whole and has leg parts protrudingly provided on lower surfaces of both ends of the holding member, the leg parts being configured to be placed on support plates each of which is protrudingly provided on each of mutually opposing inner wall surfaces of the fuel storage tank;
a holding member main body including an upper end surface with a receiving surface, the holding member main body having a length long enough for at least one end part thereof to be close to one of the inner wall surfaces of the fuel storage tank, the receiving surface being configured to receive the holding flange of the regulator, and a regulator receiving part made up of a recessed part for holding the regulator with a space between the regulator receiving part and a return port of the regulator;
an extra fuel discharge passage in a gutter shape communicating with the space of the regulator receiving part formed in the surface of the holding member main body from the regulator receiving part to the end part close to one of the inner wall surfaces of the fuel storage tank, wherein extra fuel from the regulator can be returned to fuel stored in the fuel storage tank along the inner wall surface of the fuel storage tank from a tip of the extra fuel discharge passage;
and a connector which is integrally attachable to the sidewall of the housing main body, the connector including:
a supply port configured to be in touch with and communicate with the fuel intake port formed in the sidewall when the supply port is attached to the sidewall;
and a connection port configured to communicates with the supply port and to accept a fuel supply pipe from the fuel storage tank,
wherein the connector includes at least one of two types of connectors including a first connector having a low-pressure pump and a second connector having no pump, and wherein the at least one of the two types of connectors is selectively attachable via a common connector mounting part formed on the sidewall of the housing main body.

2. The fuel supply system of claim 1, wherein a hinge supporting a float is attached to the inner wall surface of the fuel storage tank along which the extra fuel is returned, and the extra fuel flowing out from the regulator is returned along one of the inner wall surfaces, on which the hinge supporting the float is attached, from the tip of the extra fuel discharge passage to the fuel stored in the fuel storage tank.

3. The fuel supply system of claim 1, wherein a supporting shaft which has a predetermined height is erected on the holding member main body in correspondence to a position of a communication passage formed in the lid body such that the communication passage is open to atmospheric air, the supporting shaft is provided, on a tip surface thereof, with a receiving surface for receiving a ball inserted into an engaging recessed part formed in a base end of the communication passage, and in a case that the housing is laterally overturned, the ball closes the communication passage to prevent the fuel stored in the fuel storage tank from spilling out.

* * * * *